(12) United States Patent
Okumura

(10) Patent No.: US 6,246,232 B1
(45) Date of Patent: Jun. 12, 2001

(54) ROTATION SENSOR FOR GENERATING ELECTRIC SIGNALS CORRESPONDING TO TURNING ANGLE AND TURNING DIRECTION OF DETECTION TARGET

(75) Inventor: Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/477,971

(22) Filed: Jan. 5, 2000

(30) Foreign Application Priority Data

Jan. 8, 1999 (JP) .................................................. 11-003155

(51) Int. Cl.$^7$ ...................................................... G01B 7/30
(52) U.S. Cl. .................................... 324/207.2; 324/207.25
(58) Field of Search ........................... 324/207.11, 207.12, 324/207.14, 207.2, 207.21, 207.25, 244.1, 262, 691, 173, 174; 33/1 PT; 338/50, 132, 32 H, 171, 196; 250/231.16, 231.17

(56) References Cited

U.S. PATENT DOCUMENTS

| | | | |
|---|---|---|---|
| 4,550,597 | * 11/1985 | Drutchas et al. | ................. 324/207.2 |
| 5,157,329 | * 10/1992 | Brauer | ............................. 324/207.25 |
| 5,243,188 | 9/1993 | Hattori et al. | ................... 250/231.17 |
| 5,353,004 | 10/1994 | Takemoto et al. | ...................... 338/50 |
| 5,930,905 | 8/1999 | Zabler et al. | ......................... 33/1 PT |

OTHER PUBLICATIONS

Unexamined Utility Model Publication No. Sho 63–155010 in Japanese, dated Oct. 12, 1988, p. 24.

* cited by examiner

*Primary Examiner*—Jay Patidar
(74) *Attorney, Agent, or Firm*—Brinks Hofer Gilson & Lione

(57) ABSTRACT

The invention provides a rotation sensor which is capable of detecting the turning angle and the turning direction of a detection target such as a steering wheel accurately and in real time over a wide range. The rotation sensor comprises first and second rotation detection means for generating respective first and second detection signals having the same period and the different phase which repeat with a gradual increase and a gradual decrease concomitantly with rotation of a rotor, and a third rotation detection means for generating the third detection signal which repeats with a gradual increase and a gradual decrease concomitantly with rotation of the rotor, wherein the rough turning angle of the rotor is detected based on the third detection signal and the fine turning angle of the rotor is detected based on the first detection signal or the second detection signals.

13 Claims, 16 Drawing Sheets

ANGLE (DEGREE) OF STEERING WHEEL

ANGLE (DEGREE) OF STEERING WHEEL

ANGLE (DEGREE) OF STEERING WHEEL

ROTATION SENSOR FOR GENERATING ELECTRIC SIGNALS CORRESPONDING TO TURNING ANGLE AND TURNING DIRECTION OF DETECTION TARGET

BACKGROUND OF THE INVENTION

1. Field of the Invention

This invention relates to a rotation sensor for generating electric signals corresponding to rotation angle and rotation direction of a steering wheel which is connected to, for example, a steering shaft of an automobile.

2. Description of Related Art

FIG. 42 to FIG. 46 describe a prior art rotation sensor. The rotation sensor 61 comprises a base 62 fixed at the suitable static position, a rotor 69 which rotates together with a connector 63 with respect to the base 62, a speed reduction rotor 71 which is engaged rotatably with the rotor 69, a gear mechanism 73 provided between the rotor 69 and speed reduction rotor 71, and a composite board 64 supported by the base 62.

The base 62 is formed of plastic material having a circular shape in the plan view and is provided with a hole 62a at the center. The base 62 has a ring-shaped outside peripheral wall 62b on the peripheral edge on the under side and a ring-shaped inside peripheral wall 62d along the periphery of the hole 62a.

The connector 63 is formed of plastic material having a cylindrical shape. The connector 63 with a pair of projections 63a on the top end and an engagement projection 63b on the bottom side of the outside peripheral wall. The connector 63 is inserted into the hole 62a of the base 62 and the pair of projections 63a are extended beyond the top surface of the base 62 upward. The engaging projection 63b is extended beyond the inside peripheral wall 62d of the base 62 downward.

The composite board 64 is a circular disc formed of insulating material and has a hole 64a at the center, and on the bottom surface is provided with endless ring electrode patterns 65 and 66, a first resistor pattern 67 positioned inside the electrode pattern 65, and a second resistor pattern 68 positioned outside the electrode pattern 66, which are all formed by printing (in FIG. 43, slant line bands are drawn on patterns 65–68). The composite board 64 is provided with terminals 65a and 66a connected to the respective electrode patterns 65 and 66, with terminals 67a and 67b connected to both ends of the first resistor pattern 67, and with terminals 68a and 68b connected to both ends of the second resistor pattern 68. The composite board 64 is supported in a recess 62c of the base 62 with its bottom surface exposed, wherein the connector 63 and the inside peripheral wall 62d are inserted into the hole 64a.

The rotor 69, which is provided on the under side of the base, is a ring formed of plastic material having an engagement groove 69a on the inside peripheral surface and having an arm 69b which supports a first brush 70 on the outside peripheral surface. The connector 63 is inserted into the rotor 69 to engage the engagement projection 63b of the connector 63 with the engagement groove 69a of the rotor 69, and the rotor 69 is thereby supported on the base 62, and thus the rotor 69 is rotatable together with the connector 63 with respect to the base 62 wherein the first brush 70 bridges between the conductive pattern 65 and the first resistor pattern 67.

The speed reduction rotor 71 is a disk formed of insulating material having a hole 71a at the center and having a supporting shaft 71b on the top surface. The supporting shaft 71b of the speed reduction rotor 71 is positioned in the recess 62c of the base 62 so that the bottom end of the rotor 69 is engaged rotatably with the hole 71a, and the speed reduction rotor 71 is supported by the base 62 rotatably around the rotor 69 wherein the second brush 72 bridges between the conductive pattern 66 and the second resistor pattern 68.

The gear mechanism 73 comprises a planetary gear mechanism comprising a sun gear 74 formed on the outside peripheral surface of the rotor 69, an inside gear 75 formed on the inside peripheral surface of the outside peripheral wall 62b of the base 62, and a planetary gear 76 comprising a double gear supported rotatably by the supporting shaft 71b of the speed reduction rotor 71. A small diameter pinion 76a positioned on the upper stage of the planetary gear 76 is engaged with the inside gear and the large diameter pinion 76b positioned on the lower stage is engaged with the sun gear 74 so that the rotation of the connector 63 is converted to the revolution of the planetary gear 76 and the revolution is transmitted to the speed reduction rotor 71. In this system, the speed reduction ratio is set at approximately 1/4, therefore, the speed reduction rotor 71 makes a turn together with the second brush 72 at every four turns of the connector 63 together with the rotor 69 and the first brush 70.

The rotation sensor 61 structured as described herein above has the first absolute type encoder 77 comprising the first brush 70, the electrode pattern 65 and the first resistance pattern 67, and the rotor 69, and has the second absolute type encoder 78 comprising the second brush 72, the electrode pattern 66 and the second resistance pattern 68, and the rotor 69.

The rotation sensor 61 is used, for example, in an automobile. The base 62 is fixed to a suitable stationary portion such as a steering column, and a steering shaft is inserted into the connector 63, the pair of projections 63a of the connector 63 are engaged with the recess on the steering wheel 79 side as shown in FIG. 42 so that the connector 63 is rotated together with the steering wheel 79.

At that time, the first brush 70 bridges between the middle point (C1 point in FIG. 43) of the first resistance pattern 67 and the electrode pattern 65 when the steering wheel 79 is positioned at the neutral position. Therefore, when the steering wheel 79 is positioned at the neutral point, the resistance value between the terminals 65a and 67a is equal to the resistance value between the terminals 65a and 67b, however when the steering wheel 79 is turned right or left the above-mentioned resistance values change.

The resistance value increases linearly with a right turn of the steering wheel 79 (a turn in the direction of the arrow D in FIG. 43) and decreases linearly with a left turn of the steering wheel. In this case, a constant voltage Vc (the terminal 67b is the ground potential) is applied between the terminals 65a and 67b, and the first voltage signal 80 which varies as shown with a solid line in FIG. 44 correspondingly to the turn of the steering wheel 79 is generated between the terminals 65a and 67b.

In detail, the first voltage signal 80 varies from 0 to Vc at every turn of the steering wheel 79, and the turning angle and turning direction of the steering wheel 79 are detected thereby. The no signal area X between adjacent first voltage signals 80 is due to the disconnection between the first resistance pattern 67 and the electrode pattern 65 generated when the first brush 70 is positioned between the terminals 67a and 67b.

On the other hand, when the steering wheel 79 is position at the neutral position, the second brush 72 bridges between the middle point (C2 point in FIG. 43) of the second resistance pattern 68 and the electrode pattern 66. Therefore, when the steering wheel 79 is positioned at the neutral position, the resistance value between the terminals 66a and 68a is equal to the resistance value between the terminals 66a and 68b. The above-mentioned resistance values change correspondingly to a right turn or a left turn of the steering wheel 79.

As set forth above the resistance value increases linearly with a right turn (turn in the direction of the arrow D in FIG. 43) of the steering wheel 79 or decreases linearly with a left turn of the steering wheel 79. Also in this case, a constant voltage Vc (the terminal 68b is the ground potential) is applied between the terminals 68a and 68b, and the second voltage signal 81 which varies as shown with a chain double-dashed line in FIG. 44 is generated between the terminals 66a and 68b corresponding to the turn of the steering wheel 79.

The second voltage signal 81 varies from 0 to Vc at every four turns of the steering wheel 79, and the turning angle and turning direction from the neutral position of the steering wheel 79 are detected based on the variation of the second voltage signal 81.

FIG. 45 shows a schematic circuit structure for processing the above-mentioned first and second voltage signals 80 and 81. Switches 82 and 83 are analogue switches which become conductive only when the gate terminal receives a high level signal, the one switch 82 is positioned between the first absolute type encoder 77 and an output terminal 84, and the other switch 83 is positioned between the second absolute type encoder 78 and the above-mentioned output terminal 84.

A discrimination circuit 85 is structured so that the discrimination circuit 85 receives a second voltage signal 81 from the second absolute type encoder 78 and generates a discrimination signal Sd (high level signal) only when the turning angle of the steering wheel 79 indicated by means of the second voltage signal 81 is within ±45 degrees. The above-mentioned discrimination signal Sd is supplied directly to the gate terminal of the switch 82 and also supplied to the gate terminal of the switch 83 by way of an inverter 86.

Because the discrimination circuit 85 is structured as described herein above, if the turning angle of the steering wheel 79 from the neutral position is within 45 degrees, the switch 82 becomes conductive and a first voltage signal 80 from the first absolute type encoder 77 is sent out through the output terminal 84. On the other hand, if the turning angle of the steering wheel 79 from the neutral position is in the range outside ±45 degrees, the switch 83 becomes conductive and a second voltage signal 81 from the second absolute type encoder 78 is sent out through the output terminal 84.

In other words, a signal which has been formed by synthesizing a first and second voltage signals 80 and 81 as shown in FIG. 46 is generated as the steering wheel 79 is turned. The signal from the output terminal 84 (the signal which indicates the turning angle and the turning direction from the neutral position of the steering wheel 79) is used for suspension control and automatic transmission control of an automobile.

The second voltage signal 81 from the second absolute type encoder 78 varies linearly even when the steering wheel 79 is made a plurality of turns, as the result the turning angle and the turning direction from the neutral position of the steering wheel 79 are detected in real time based on the above-mentioned second voltage signal 81. However, the above-mentioned second voltage signal 81 is disadvantageous in that the variation magnitude per turning angle of the steering wheel 79 is small and the resolution, namely accuracy, is low because the second voltage signal 81 is obtained by reducing the turning of the steering wheel 79.

On the other hand, because the first voltage signal 80 generated from the first absolute type encoder 77 is obtained from the rotor 69 which is rotated together with the steering wheel 79, the accuracy of the turning angle information and the turning direction information of the steering wheel 79 obtained based on the first voltage signal 80 is high though it is disadvantageous in that the neutral position of the steering wheel 79 can not be specified.

Accordingly, the mutually complemental use of the first and second voltage signals 80 and 81 as shown in FIG. 45 allows us to detect the turning angle from the neutral position of the steering wheel 79 over the wide range at high accuracy in real time. In the range of turning angle of the steering wheel 79 (in the range within ±45 degrees) where high accuracy is particularly required, the use of the first voltage signal 80 as described herein above allows us to control the suspension and automatic transmission of an automobile accurately.

However, the above-mentioned prior art rotation sensor is disadvantageous in that there is some range where the second voltage signal 81 can not be complemented by the first voltage signal 80 and all the ranges can not be complemented by the first voltage signal 80, and as the result the turning angle of the detection target such as the steering wheel 79 can not be detected accurately and in real time over the wide range because there is a no signal area X between adjacent first voltage signals 80.

SUMMARY OF THE INVENTION

The present invention was accomplished to solve the above-mentioned problem. In particular, is the object of the present invention to provide a rotation sensor which is capable of detecting the turning angle and turning direction of the detection target in a wide angular range accurately and in real time.

To solve the above-mentioned problem, a first embodiment of the present invention comprises: a rotor; first and second rotation detection means for generating the first and second detection signals respectively having the same period and different phase concomitantly with rotation of the rotor, wherein the output value of at least any one of the first and second detection signals changes gradually concomitantly with turning of the rotor in the arbitrary area of rotation of the rotor; third detection means for generating the third detection signal concomitantly with rotation of the rotor, wherein the output of the third detection signal increases gradually in the entire range of turning angle of the rotor when the rotor turns in one direction, and the output decreases gradually when the rotor turns in the other direction; and a rotation angle calculation means that reads the third detection signal to obtain the rough turning angle of the rotor based on the third detection signal, reads the first and second detection signals to obtain the fine turning angle of the rotor based on the first and second detection signals, and determines the turning angle of the rotor based on the rough turning angle and fine turning angle. Accordingly, the turning angle and the turning direction of a detection target can be detected accurately over the wide range.

To solve the above-mentioned problem, a second embodiment of the present invention is the above-mentioned first embodiment, wherein, when the one signal is at the top of an output waveform, the rotation angle calculation means reads the output of the other signal, and calculates the fine turning angle based on the output of the other signal. Accordingly, because the output is little changed with respect to the turning angle near the top or discontinuous area is not used, the turning angle of a detection target is detected accurately.

To solve the above-mentioned problem, a third embodiment of the present invention is the above-mentioned first embodiment wherein the first and second rotation detection means generate the first and second detection signals of any one of a sine wave, a triangle wave, or a saw tooth wave. Accordingly, because there is an area where the output signal changes linearly concomitantly with turning of the rotor, the turning angle of a detection target is detected accurately by means of the detection signal in this area.

To solve the above-mentioned problem, a fourth embodiment of the present invention is the above-mentioned first embodiment, wherein the fine turning angle is detected on inclined lines of the first and second detection signals alternately. Accordingly, the turning angle of a detection target can be detected accurately.

To solve the above-mentioned problem, a fifth embodiment of the present invention is the above-mentioned first embodiment, wherein the phase difference between the first and second detection signals is 90° degrees. Accordingly, generation of an area where the third detection signal is not complemented with the first and second detection signals can be prevented.

To solve the above-mentioned problem, a sixth embodiment of the present invention is the above-mentioned first embodiment, wherein each of the first, second, and third rotation detection means comprises a positional information recorder and detector. Accordingly, the structure of the first, second, and third rotation detection means is simplified, and the fabrication work efficiency can be improved.

To solve the above-mentioned problem, a seventh embodiment of the present invention is the above-mentioned first embodiment, wherein the positional information recorder comprises a magnet and the detector comprises a magneto-electric conversion element. Accordingly, the structure of the first, second, and third rotation detection means is simplified, and the fabrication work efficiency can be improved.

To solve the above-mentioned problem, an eighth embodiment of the present invention comprises: a rotor; a case for containing the rotor rotatably; a rotation shaft contained in the case and rotating interlocking with the rotation of said rotor; a movable member which slides in an axial direction of said rotation shaft interlocking with the rotation of said rotation shaft; a first rotation detection means comprising the first positional information recorder and the first detector, wherein any one of the first positional information recorder and the first detector is engaged with the rotation shaft and the other is held on the case, the first rotation detection means generates a first detection signal concomitantly with rotation operation of the rotation shaft; and a third detection means comprising the third positional information recorder and the third detector, wherein any one of the third positional information recorder and the detector is disposed on the movable member and the other is held on the case, the third detection means generates a third detection signal having the output which gradually increases over the entire range of the turning angle of the rotor correspondingly to sliding motion of the movable member in one direction concomitant with turning of the rotor in one direction, and which gradually decreases over the entire range of the turning angle of the rotor correspondingly to sliding motion of the movable member in the other direction concomitant with turning of the rotor in the other direction. Accordingly, the turning angle and the turning direction of a detection target can be detected accurately over the wide range, and the first, second, and third detection signals are generated with the simple structure without using a complex gear mechanism.

To solve the above-mentioned problem, a ninth embodiment of the present invention is the above-mentioned eighth embodiment, wherein the rotation sensor is provided with the second detector, the second detector is engaged with any one of the rotation shaft with which the first detector is engaged and the case, and the second detector and the first positional information recorder cooperatively generates a second detection signal having the same period as that of the first detection signal and the phase different from the first detection signal. Accordingly, only the first positional information recorder may be provided as the information recorder for generating the second detection signal and the first detection signal, and thus the structure can be simplified.

To solve the above-mentioned problem, a tenth embodiment of the present invention is the above-mentioned eighth embodiment, wherein a pair of holding members each of which having a cut at the top for allowing the rotation shaft to be inserted downward through the cut is provided in the case, and the holding members hold the circumferential surface of both ends of the rotation shaft so as to be rotatable, and a pair of walls which are in contact with both end sides of the rotation shaft is provided in the case, the thickness of one of the pair of walls is formed thinner than that of the other, one of the pair of walls presses the rotation shaft in the axis direction to press the other end of the rotation shaft against the other of the pair of walls for contact. Accordingly, the rotation shaft is set supportingly on the case without backlash only by placing the rotation shaft on the holding member downward through the cut, and thus the fabrication work efficiency can be improved.

To solve the above-mentioned problem, an eleventh embodiment of the present invention is the above-mentioned eighth embodiment, wherein a guide is provided on the case, a guided member to be engaged with the guide is provided on the movable member, the guided member is guided by the guide so that the movable member is slid in the axis direction of the rotation shaft. Accordingly, the movable member can be slid smoothly without backlash.

To solve the above-mentioned problem, a twelfth embodiment of the present invention is the above-mentioned eighth embodiment, wherein the third positional information recorder of the third detection means and the third detector of the third detection means comprise a magnet and a magneto-electric conversion element respectively, the magnet is mounted on the movable member and the magneto-electric conversion element is mounted in the case, and the periphery of the sliding range of the magnet of the third detection means is covered with a magnetic shielding member. Accordingly, the influence of magnetic flux leakage of the magnet inside and outside the case and the influence of magnetic noise on the hole element are eliminated, and thus the detection accuracy by means of the third detection means can be improved.

To solve the above-mentioned problem, a thirteenth embodiment of the present invention is the above-mentioned eighth embodiment, wherein a rotator which rotates together with the rotation shaft is attached to the rotation shaft, helical gears are formed both on the rotor and the rotator, the helical gear of the rotor is engaged with the helical gear of the rotation shaft, and the rotation shaft is rotated with linking to turning of the rotor by means of the engagement. Accordingly, the backlash between the rotor and the rotation shaft is minimized, and the rotation of the rotation shaft is linked to the turning of the rotor consistently.

DETAILED DESCRIPTION OF THE PREFERRED EMBODIMENTS

Figure 1:
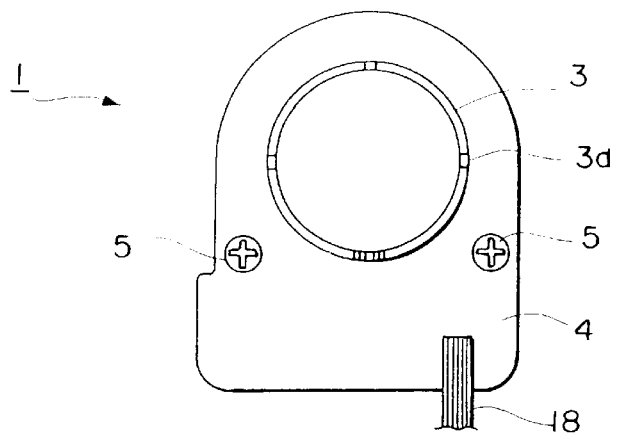
FIG. 1 is a plan view of a rotation sensor of the present invention.
Figure 2:
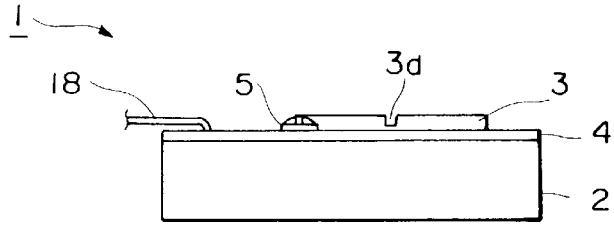
FIG. 2 is a side view of the rotation sensor of the present invention.

An embodiment of a rotation sensor of the present invention will be described in detail hereinafter with reference to FIG. 1 to FIG. 41.

A rotation sensor 1 is made of a synthetic resin such as plastic, and comprises a case 2 and a top cover 4 which are combined with screws 5 to form a box, a rotor 3 contained rotatably in the box comprising the case 2 and top cover 4, and a rotation detection mechanism for detecting the rotation of the rotor 3 contained in the box.

Figure 7:
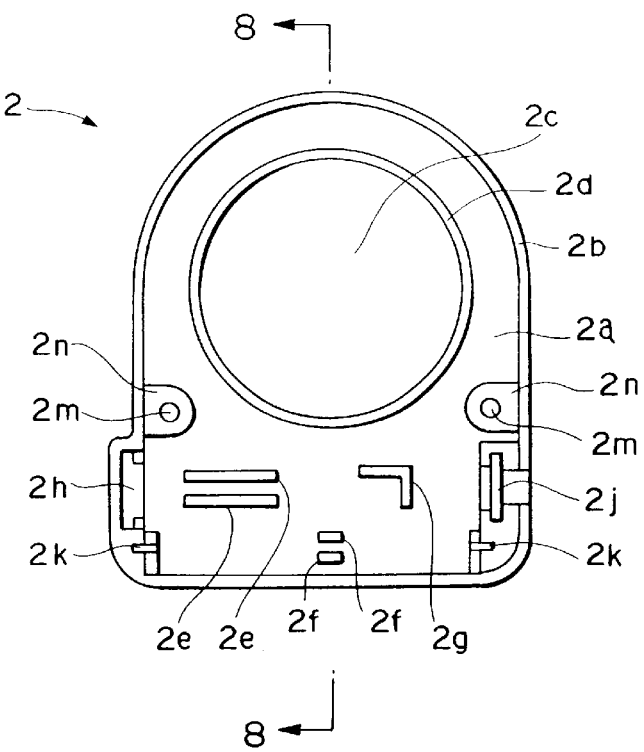
FIG. 7 is a plan view of a case in accordance with the rotation sensor of the present invention.
Figure 8:
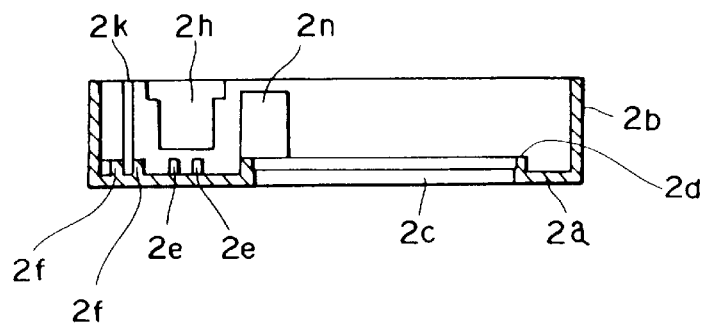
FIG. 8 is a cross sectional view along the line 8—8 in FIG. 7.
Figure 9:
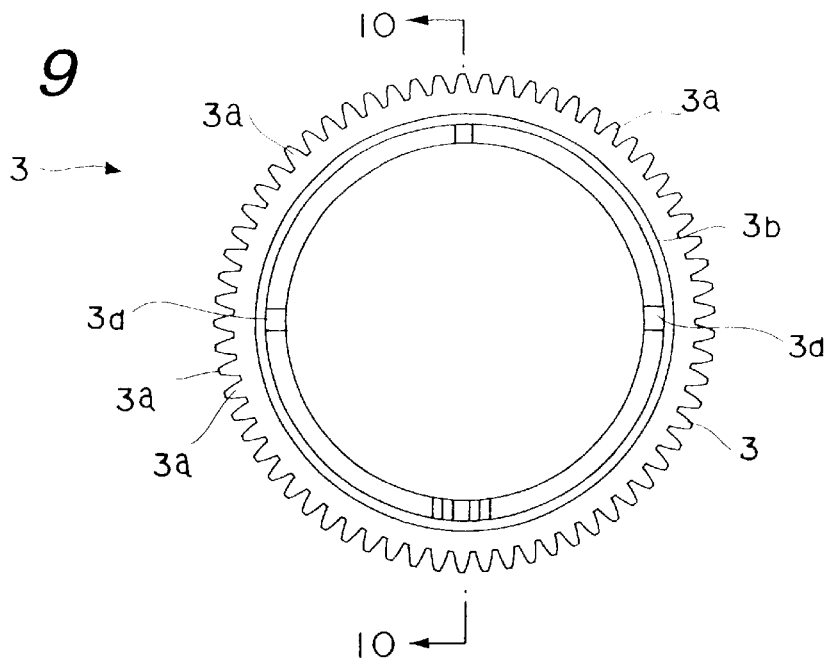
FIG. 9 is a plan view of a rotor in accordance with the rotation sensor of the present invention.
Figure 10:
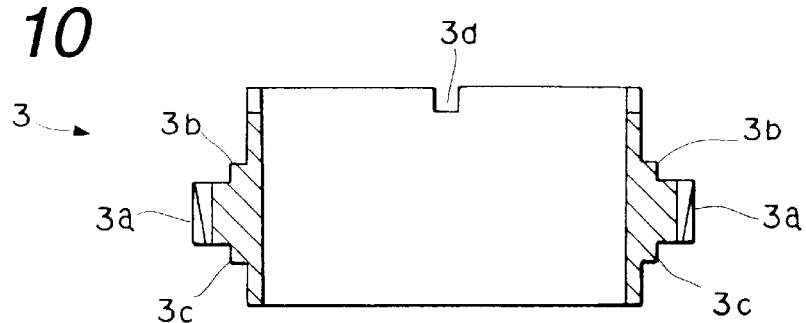
FIG. 10 is a cross sectional view along the line 10—10 in FIG. 9.

The case 2 is a box comprising a flat bottom 2*a* and a side wall 2*b* connected to the edge of the bottom 2*a*, a circular hole 2*c* is provided in the bottom 2*b*, a ring projection 2*d* formed along the periphery of the hole 2*c*, and a pair of rail guides 2*e*, a pair of projections 2*f*, and an L-shaped positioning projection 2*g* that are combined to form a part as shown in FIG. 7 and FIG. 8. Engagement grooves 2*h* and 2*j* and a pair of support grooves 2*k* are formed face to face on the right and left sides of the side wall 2*b* having a tapped hole 2*m* to which the above-mentioned screw 5 is screwed, and a pair of projections 2*n* having the bottom connected to the bottom 2*a* are formed on the side wall 2*b*.

The rotor 3 is a cylinder member formed of a synthetic resin such as plastic and having a plurality of helical gears 3*a* formed on the entire outside peripheral surface, and ring steps 3*b* and 3*c* formed on the top and bottom of the helical gears 3*a*, respectively. A pair of cuts 3*d* are formed face to face on the top end of the rotor 3. The rotor 3 is contained in the case 2 wherein the ring step 3*c* is in contact with the projection 2*d* as shown FIG. 4 and FIG. 5.

Figure 5:
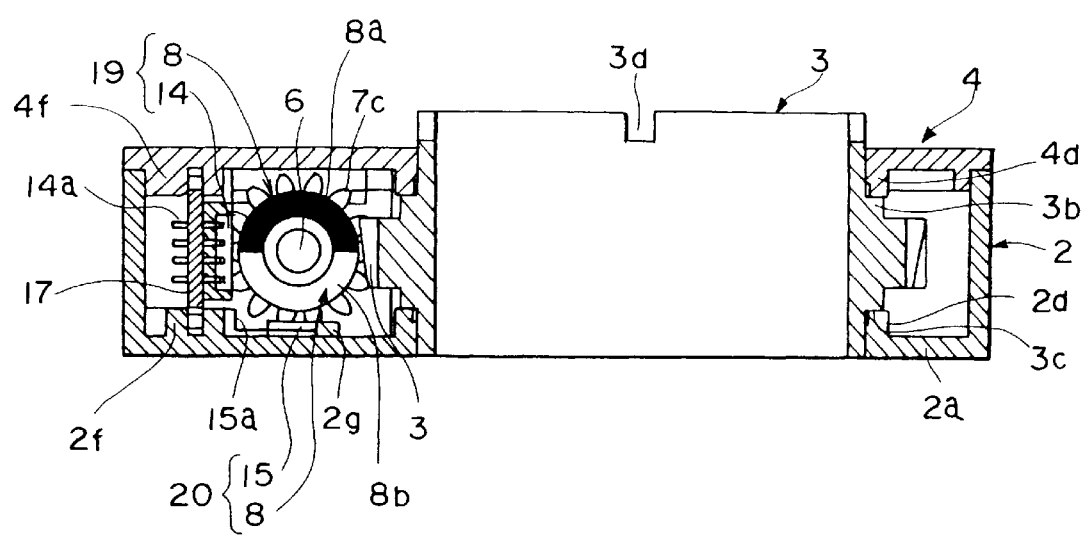
FIG. 5 is a cross sectional view of the rotation sensor of the present invention.
Figure 6:
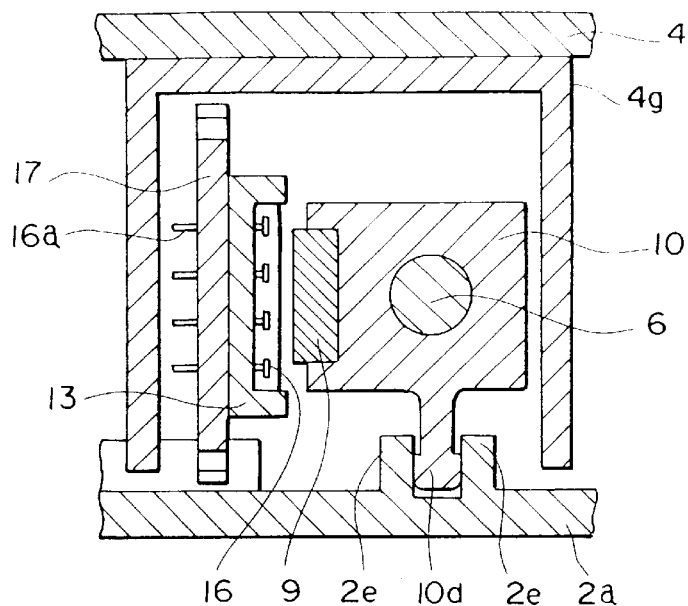
FIG. 6 is a partially enlarged cross sectional view of the rotation sensor of the present invention.
Figure 11:
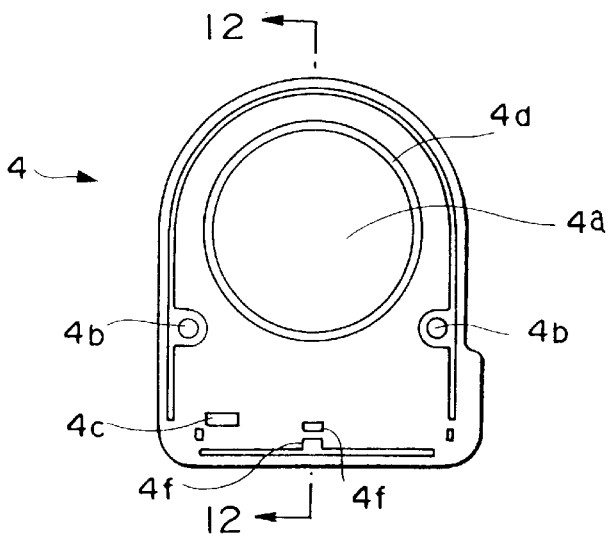
FIG. 11 is a bottom view of the top cover in accordance with the rotation sensor of the present invention.
Figure 12:
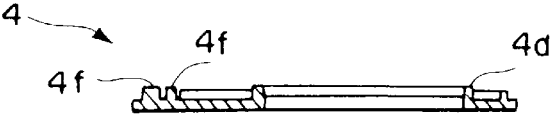
FIG. 12 is a cross sectional view along the line 12—12 in FIG. 11.

The top cover 4 is a flat plate member formed of a synthetic resin such as plastic and having a circular hole 4*a*, a pair of fixing holes 4*b* and drawing hole 4*c*, and having a ring projection 4*d* along the periphery of the hole 4*a* as shown in FIG. 11 and FIG. 12. On the bottom surface of the top cover 4, a pair of projections 4*f* are formed, and a shielding member 4*g* for magnetic shielding having a C-shape cross section comprising a steel flat plate is mounted by means of suitable attachment means such as caulking as shown in FIG. 6. The top cover 4 is fixed to the case 2 by screwing the above-mentioned screw 5 through the fixing hole 4*b* and into the tapped hole 2*m* of the case 2 wherein the top end of the rotor 3 is extended from the hole 4*a* beyond the hole 4*a*. The ring projection 4*d* is in contact with the ring step 3*b* of the rotor 3 to support the rotor 3 rotatably in cooperation with the ring projection 2*d* of the case 2 as shown in FIG. 5.

The above-mentioned rotation detection mechanism mainly comprises a rotation shaft 6 having a helical screw groove 6*b* on one side, a rotator 7 fixed through to the rotation shaft 6, a first magnet 8 fixed through to the rotator 7 (positional information recorder), a movable member 10 screwed into the screw groove 6*b* to support the second magnet 9 (positional information recorder), bearings 11 and 12 for rotatably supporting both ends of the rotation shaft 6, the first and second Hall elements 14 and 15 (detector) which are magneto-electric conversion elements disposed face to face with the first magnet 8, the third Hall element 16 (detector) which is a magneto-electric conversion element disposed face to face with the second magnet 9, and a circuit board 17 to which these first, second, and third Hall elements 14, 15, and 16 are connected.

Figure 13:
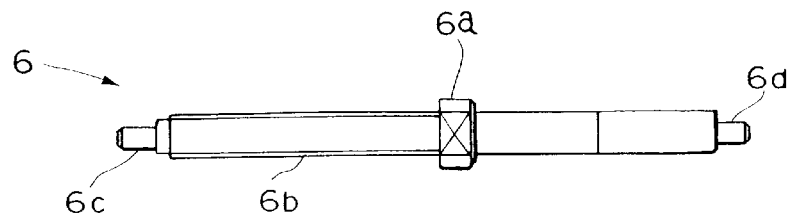
FIG. 13 is a plan view of a rotation shaft in accordance with the rotation sensor of the present invention.
Figure 14:
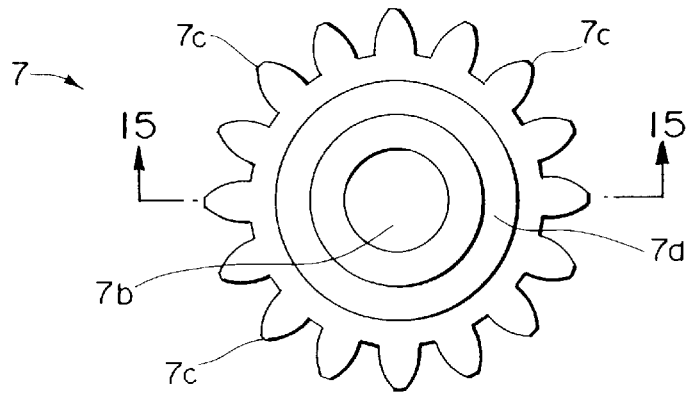
FIG. 14 is a side view of the rotator in accordance with the rotation sensor of the present invention.
Figure 15:
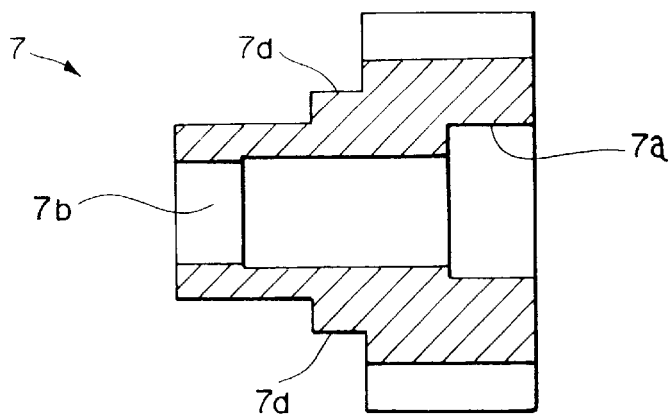
FIG. 15 is a cross sectional view along the line 15—15 in FIG. 14.
Figure 16:
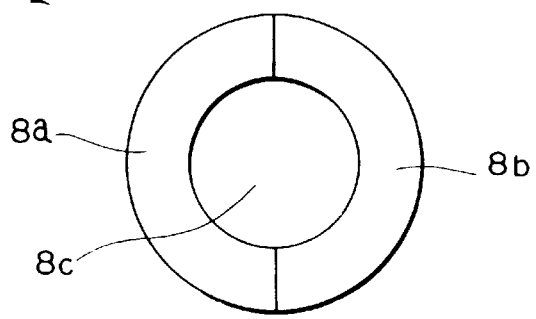
FIG. 16 is a plan view of the first magnet in accordance with the rotation sensor of the present invention.

The rotation shaft 6 consists of a metal material such as brass or aluminum, and has a large diameter portion 6*a* at the middle as shown in FIG. 13. A helical screw groove 6*b* is formed from the large diameter portion 6*a* to the one end side, and both ends are cut to form small diameter portions 6*c* and 6*d*.

The rotator 7 is a cylinder member formed of a synthetic resin material such as plastic, has a through hole 7*b* having a D-shaped large diameter portion 7*a* at the center, and has a plurality of helical gears 7*c* formed on one end side over the entire peripheral surface. The other end side is cut from the helical gears 7*c* to form a ring step 7*d*. The rotator 7 is press-fitted to the rotation shaft 6, and the large diameter portion 6*a* of the rotation shaft 6 is positioned in the large diameter portion 7*a* wherein the rotation shaft 6 is fitted in the through hole 7*b* non-rotatably.

The first magnet 8 is a ring member formed of a magnetic material such as ferrite having 180 degree angle N pole 8*a* and 180 degree angle S pole 8*b* and having a through hole 8*c* at the center. The other end side of the rotator 7 is inserted fixedly into the through hole 8*c* of the first magnet 8 wherein the step 7*d* of the rotator 7 is in contact with the first magnet 8.

Figure 17:
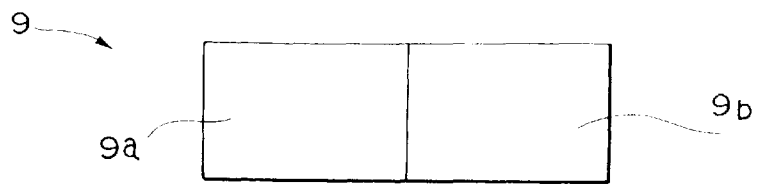
FIG. 17 is a plan view of the second magnet in accordance with the rotation sensor of the present invention.

The second magnet 9 is a rectangular member formed of a magnetic material such as ferrite like the first magnet 8, wherein the one end side is N pole 9*a* and the other end side is S pole 9*b* as shown in FIG. 17.

Figure 3:
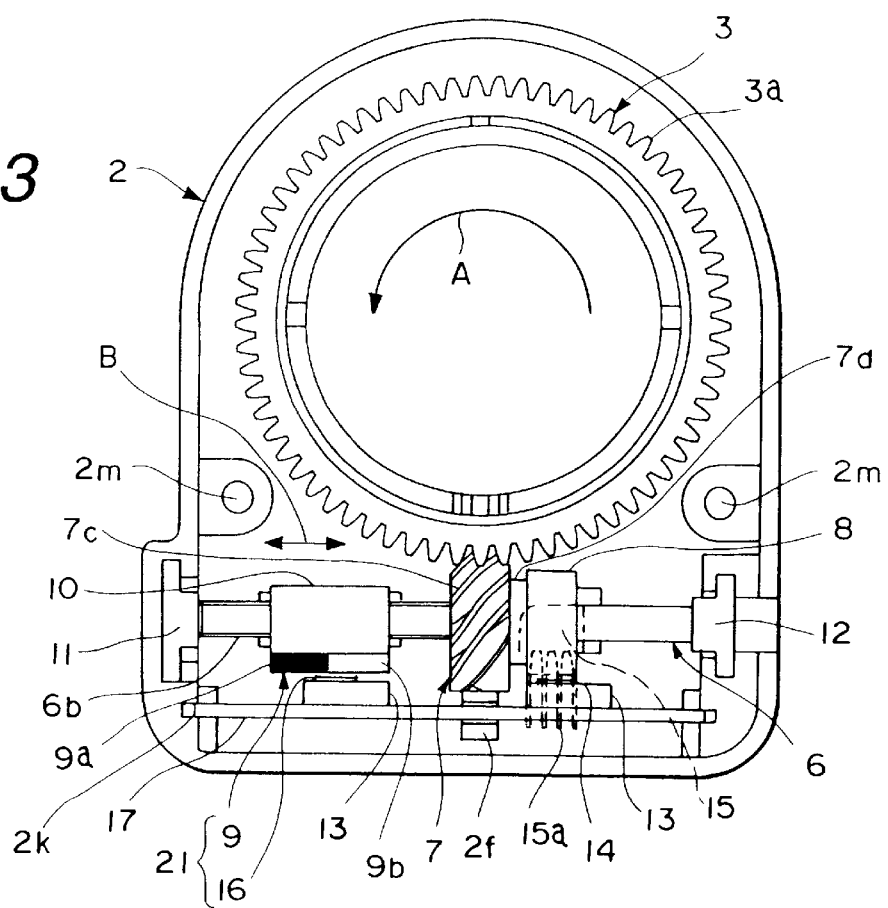
FIG. 3 is a plan view of the rotation sensor of the present invention without a top cover.
Figure 4:
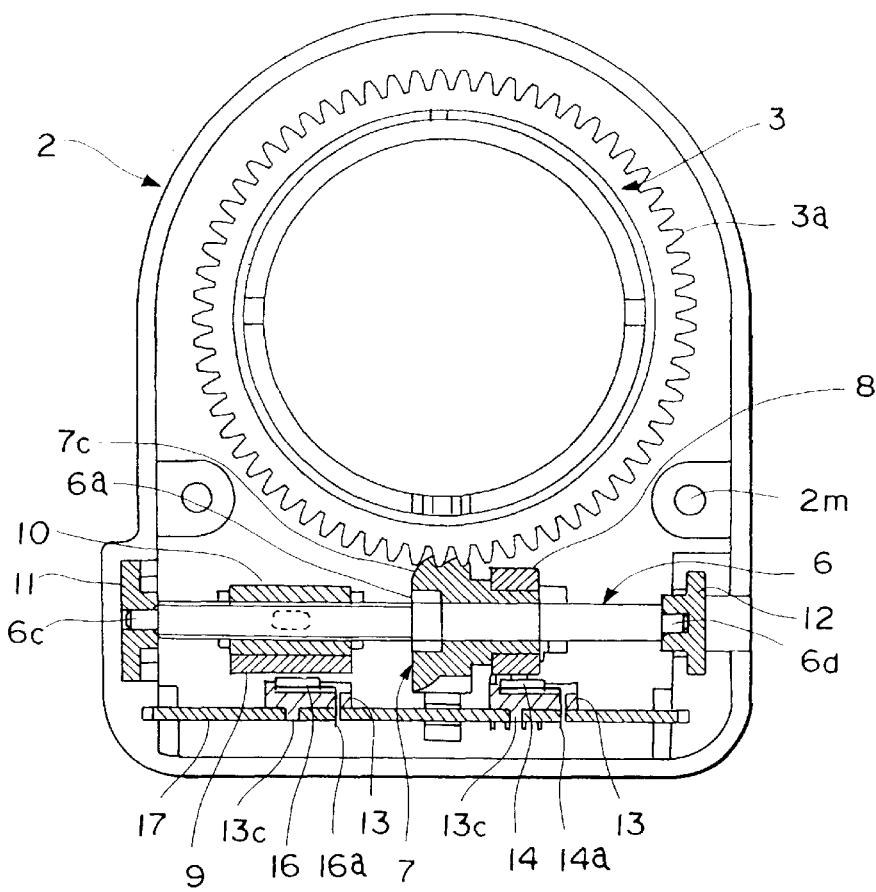
FIG. 4 is a partially cut-away plan view of the rotation sensor of the present invention.
Figure 18:
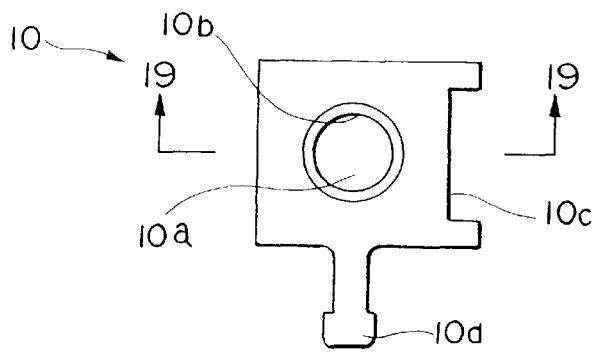
FIG. 18 is a side view of a movable member in accordance with the rotation sensor of the present invention.
Figure 19:
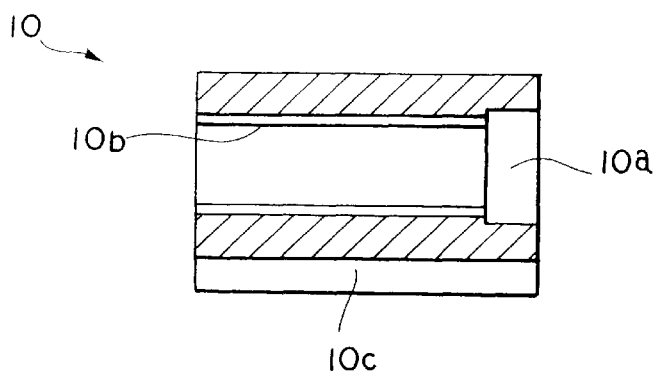
FIG. 19 is a cross sectional view along the line 19—19 in FIG. 18
Figure 20:
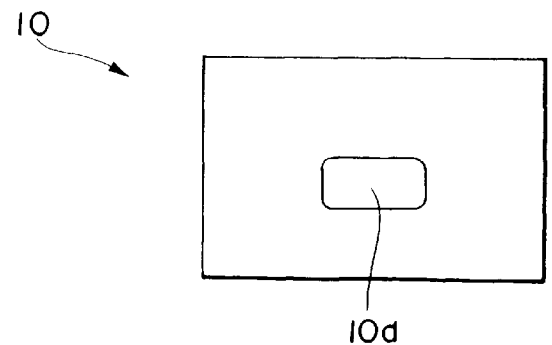
FIG. 20 is a bottom view of the movable member in accordance with the rotation sensor of the present invention.

The movable member 10 is a rectangular parallelepiped member formed of a synthetic resin material such as plastic and having a through hole 10*a* extending from one end to the other end as shown in FIG. 19. A thread 10*b* is formed on the inside surface of the through hole 10*a*. On one side of the movable member 10, a recess 10*c* to which the second magnet is to be fixed by means of insert molding is formed as shown in FIG. 18, and a guided projection 10*d* to be engaged with a pair of guide members 2*e* of the case 2 is provided. The movable member 10 is supported by the rotation shaft 6 as shown in FIG. 3 wherein the one end side of the rotation shaft 6 is screwed into the through hole 10*a* and the thread 10*b* is screwed to the screw groove 6*b* of the rotation shaft 6.

Figure 21:
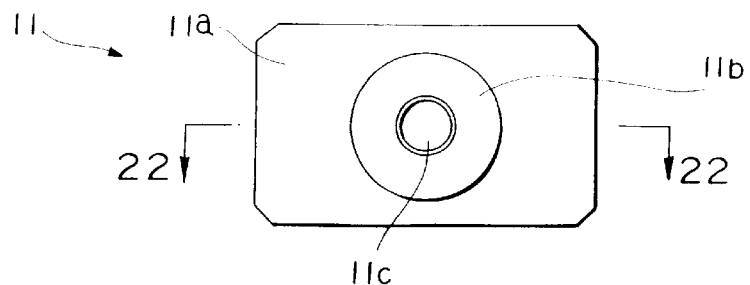
FIG. 21 is a plan view of a bearing in accordance with the rotation sensor of the present invention.
Figure 22:
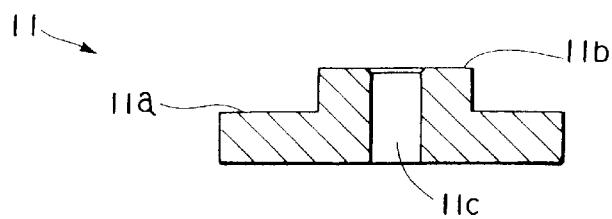
FIG. 22 is a cross sectional view along the line 22—22 in FIG. 21.

The bearing 11 is formed of a synthetic resin material such as plastic, and comprises a rectangular flat plate 11*a* and a cylinder 11*b* formed solidly with the flat plate 11*a* at the center thereof as shown in FIG. 21 and FIG. 22. A hole 11*c* extending to the flat plate 11*a* is formed through the center of the cylinder 11*b*. The bearing 11 supports the one end side of the rotation shaft 6 rotatably as shown in FIG. 3 wherein the small diameter portion 6*c* of the one end side of the rotation shaft 6 is inserted into the hole 11*c* and the flat plate 11*a* is inserted into the engagement groove 2*h* of the case 2.

Figure 23:
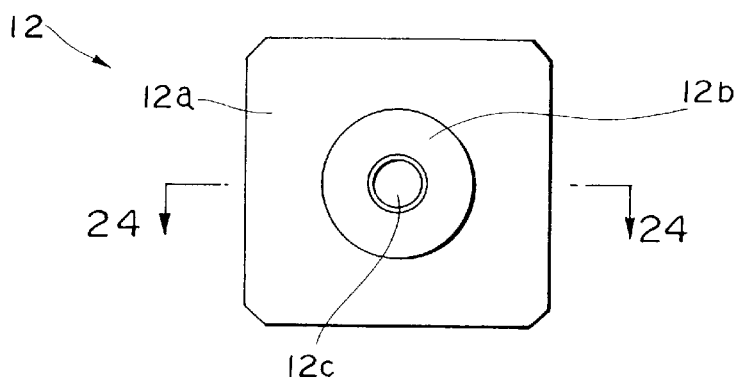
FIG. 23 is a plan view of a bearing in accordance with the rotation sensor of the present invention.
Figure 24:
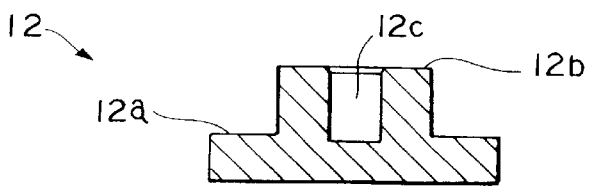
FIG. 24 is a cross sectional view along the line 24—24 in FIG. 23.

The bearing 12 is formed of a synthetic resin material such as plastic, and comprises a square flat plate 12*a* and a cylinder 12*b* formed solidly with the flat plate 12*a* at the center thereof as shown in FIG. 23 and FIG. 24. A hole 12*c* is formed through the center of the cylinder 12*b*. The bearing 12 supports the rotation shaft 6 rotatably on the case 2 in cooperation with the above-mentioned bearing 11 as shown in FIG. 3 wherein the small diameter portion 6*d* of the other end side of the rotation shaft 6 is inserted into the hole 12*c* and the flat plate 12*a* is inserted in the engagement groove 2*j* of the case 2.

Figure 25:
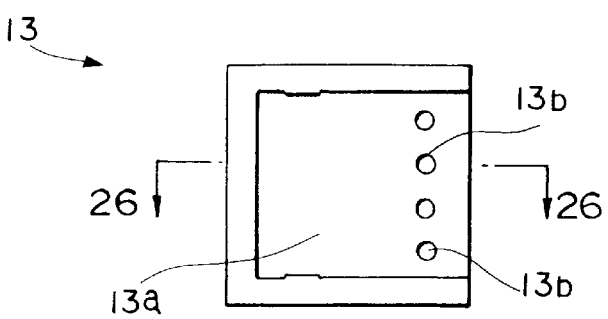
FIG. 25 is a plan view of a holder in accordance with the rotation sensor of the present invention.
Figure 26:
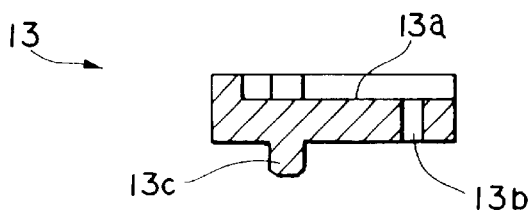
FIG. 26 is a cross sectional view along the line 26—26 in FIG. 25

The holder 13 is a rectangular member formed of a insulating synthetic resin material such as plastic and having a recess 13*a* formed open on the other end side on the top surface as shown in FIG. 25 and FIG. 26. Holes 13*b* are formed on the recess 13*a*. A projection 13*c* is formed on the bottom side of the holder 13.

The first, second, and third Hall elements 14, 15, and 16 are formed rectangular, and terminals 14*a*, 15*a*, and 16*a* are lead out from the end sides. The first and third Hall elements 14 and 16 are fitted and held in the recess 13*a* of the above-mentioned holder 13, and the terminals 14*a* and 16*a* are extended through the holes 13*b* to the under side.

Figure 27:
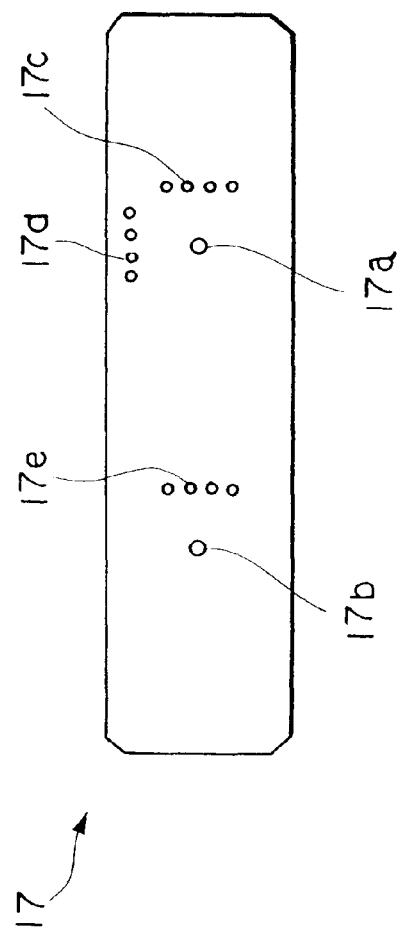
FIG. 27 is a plan view of a circuit board in accordance with the rotation sensor of the present invention.

The circuit board 17 comprises a flat insulating board having large holes 17*a* and 17*b* and small holes 17*c*, 17*d*, and 17e as shown in FIG. 27. On the bottom surface of the circuit board 17, a conductive pattern (not shown in the drawing) which extends from edges of the small holes 17c, 17d, and 17e is formed, and electric parts such as resistors and capacitors which are components of an electric circuit and connected to the conductive pattern are mounted (not shown in the drawing). Both ends of the circuit board 17 are fitted in a pair of supporting grooves 2k of the case 2 as shown in FIG. 3, and the center of the circuit board 17 is inserted between the pair of projections 2f of the case. Thus, the circuit board 17 is supported on the case 2 firmly.

The projection 13c of the holder 13 is inserted tightly into the large diameter holes 17a and 17b to support the first and third hall elements 14 and 16 on the circuit board 17. The terminals 14a and 16a are inserted through the small diameter holes 17c and 17e to the bottom side of the circuit board 17. On the bottom side, the terminals 14a and 16a are soldered so as to be connected to the above-mentioned conductive pattern (not shown in the drawing). As shown in FIG. 5, the terminal 15a which has been bent in L-shape is inserted through the small diameter hole 17d to the bottom side of the circuit board 17. On the bottom side, the terminal 15a is soldered so as to be connected to the above-mentioned conductive pattern (not shown in the drawing), thereby supporting the second hole element 15. The one end of the cable 18 shown in FIG. 1 is connected to the circuit board 17.

Next, fabrication of the rotation sensor 1 is described herein under. First, the first, second, and third hall elements 14, 15, and 16 are mounted on the circuit board 17, the terminals 14a, 15a, and 16a are connected to the above-mentioned conductive pattern (not shown in the drawing), both ends of the circuit board 17 to which the cable 18 has been connected is inserted in the pair of grooves 2k of the case 2, and the edge of the circuit board 17 is inserted between the pair of projections 2f of the case 2 as described herein above. Next, the first magnet 8 is engaged with the other end side of the rotator 7 which has been mounted on the rotation shaft 6, then the one end side of the rotation shaft 6 is screwed into the through hole 10a of the movable member 10 on which the second magnet 9 has been mounted, and the movable member 10 is supported on the rotation shaft 6 so that the second magnet 9 is positioned at the middle of the screw groove 6b.

Next, the bearings 11 and 12 are inserted from the holes 11c and 12c into the small diameter portions 6c and 6d of both ends of the rotation shaft 6 to fix the bearings 11 and 12 to the rotation shaft 6. The flat plates 11a and 12a of the bearings 11 and 12, which have been fixed to the rotation shaft 6, are inserted tightly in the engagement grooves 2h and 2j of the case 2, and the guided projection 10d of the movable member 10 is inserted between the guides 2e of the case 2 to support the rotation shaft 6 rotatably in the case 2. Next, the ring step 3c of the rotor 3 is placed on the ring projection 2d of the case 2, and the rotor 3 is contained in the case 2. Thereafter, the shield member 4g is mounted on the bottom surface of the top cover 4, the case is covered with the top cover. At that time, the cable 18 is drawn out through the drawing hole 4c, the screw 5 is screwed from the fixing hole 4b into the screw hole 2m, and the top cover is fixed to the case 2.

The fabrication of the rotation sensor 1 is completed as described herein above. In this fabricated state, the second hall element 15 is in contact with the positioning projection 2g of the case 2, the first and second hall elements 14 and 15 are faced with the first magnet 8 with an angle of 90 degrees made by the first and second hall elements 14 and 15, the third hall element 16 is faced with the second magnet 9, the end of the circuit board 17 is positioned between the pair of projections 4f of the top cover 4, and the other ends side of the cable 18 is extended out to the outside. The helical gear 3a of the rotor 3 has been engaged with the helical gear 7c of the rotator 7, the reduction ratio to the rotator 7 of the rotor 3 is set to be 1/4, and because the helical gear 3a of the rotor 3 has been engaged with the helical gear 7c of the rotator 7, the rotator 7 is turned together with the rotation shaft 6 and the first magnet 8 with linking to turning of the rotor 3, and the rotator 7 is made four turns at every one turn of the rotor 3.

When the rotor 3 has made two turns (rotation in the direction of the arrow A in FIG. 3), the engagement between the screw groove 6b of the rotation shaft 6 and the thread 10b of the movable member 10 converts the rotation of the rotation shaft 6 to the linear motion of the movable member 10, the movable member 10 is moved in the axis direction of the rotation shaft 6 (direction of the arrow B in FIG. 3) with aid of guiding of the guide 10d along the guided member 2e to the position of the one end side of the screw groove 6b, N. pole 9a of the second magnet 9 is moved to the position apart farthest from the third hall element 16. When the rotor has made left two turns (rotation in the opposite direction to the arrow A in FIG. 3), the movable member is moved to the position of the other end side of the screw groove 6b, and the N. pole 9a of the second magnet 9 is moved to the position nearest to the third hall element 16. At that time, the shieldmember 4g covers the periphery of the sliding range of the second magnet 9 as shown in FIG. 6.

In the rotation sensor 1 fabricated and structured as described herein above, the first magnet 8 and the first hall element 14 constitute the first rotation detection means 19 shown in FIG. 5, the first magnet 8 and the second hall element 15 constitute the second rotation detection means 20, and the second magnet 9 and the third hall element 16 constitute the third rotation detection means 21. A rotation sensor 1 of this type is typically incorporated in, for example, an automobile. The case 2 is fixed to a suitable stationary portion such as a steering column (not shown in the drawing), the steering shaft is inserted through the rotor 3 so that the pair of cuts 3d are engaged with the projection of the steering wheel side (not shown in the drawing). Thus, the rotation sensor 1 is mounted on the automobile so that the rotor 3 is turned together with the steering wheel.

Figure 29:
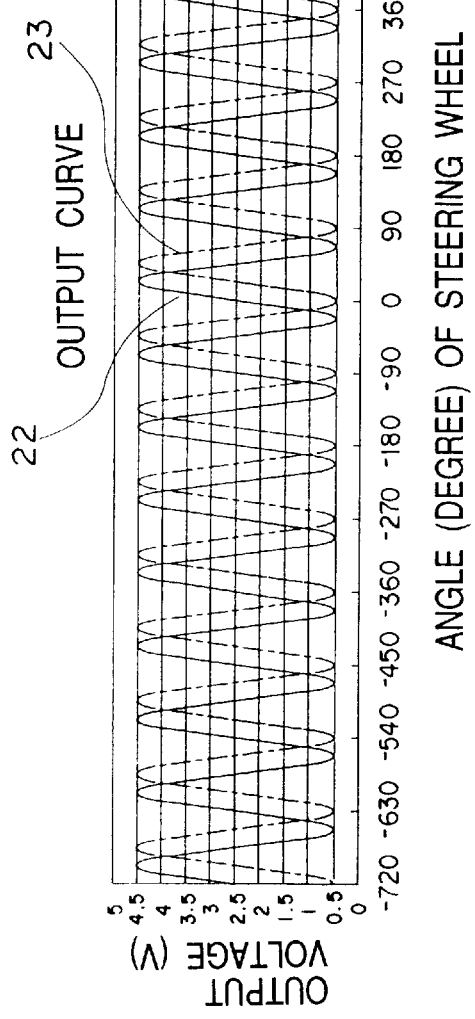
FIG. 29 is an output characteristic diagram of the first and second rotation detection means in accordance with the rotation sensor of the present invention.
Figure 30:
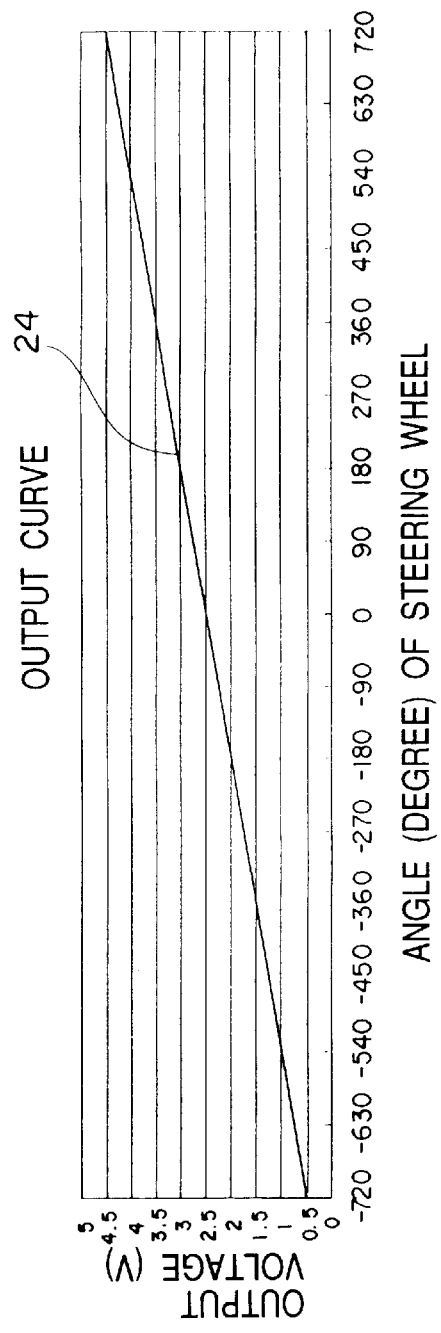
FIG. 30 is an output characteristic diagram of the third rotation detection means in accordance with the rotation sensor of the present invention.

At that time, as shown in FIG. 29 and FIG. 30, in the state that the steering wheel is positioned at the neutral position, the first and third rotation detection means 19 and 21 both generate a voltage of 2.5 V and the second rotation detection means 20 generates a voltage of 0.5 V. Accordingly, when the steering wheel is turned right or left and the rotor 3 is turned concomitantly, the first rotation detection means 19 generates a first detection signal 22 having sine alternate waveform with an amplitude of 2V and a period of 90 degrees which repeats gradual increase and decrease as the result of detection of the magnet 8 by the first hall element 14, and on the other hand the second rotation detection means 20 generates a second detection signal 23 having sine alternate waveform with an amplitude of 2V and a period of 90 degrees and having a phase with deviation of ¼ period from the first detection signal 22, which repeats with a gradual increase and a decrease as the result of detection of the first magnet 8 by the hall element 15 as shown in FIG. 29.

When the steering wheel is turned, the third rotation detection means 21 concomitantly generates a third detection signal 24 which gradually increases or decreases as shown in FIG. 30 as the result of the motion of the second magnet 9 detected by the third hall element 16. In detail, the third detection signal 24 gradually varies linearly from 0.5 V to 4.5 V correspondingly to four turns of the steering wheel, and the rough turning angle (approximate turning angle) and the turning direction from the neutral position of the steering wheel which is turned together with the rotor 3 is thereby detected.

Figure 28:
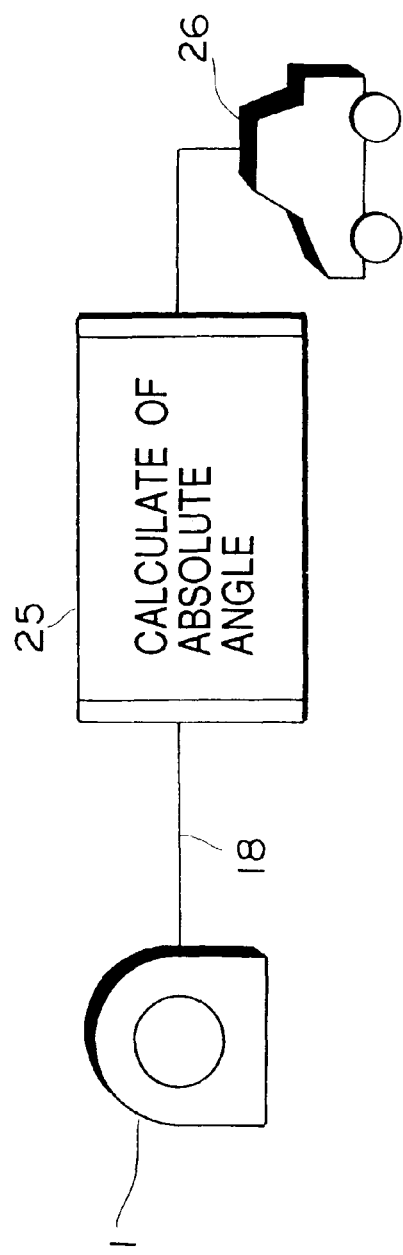
FIG. 28 is a block diagram for illustrating the schematic structure of a signal processing circuit in accordance with the rotation sensor of the present invention.
Figure 31:
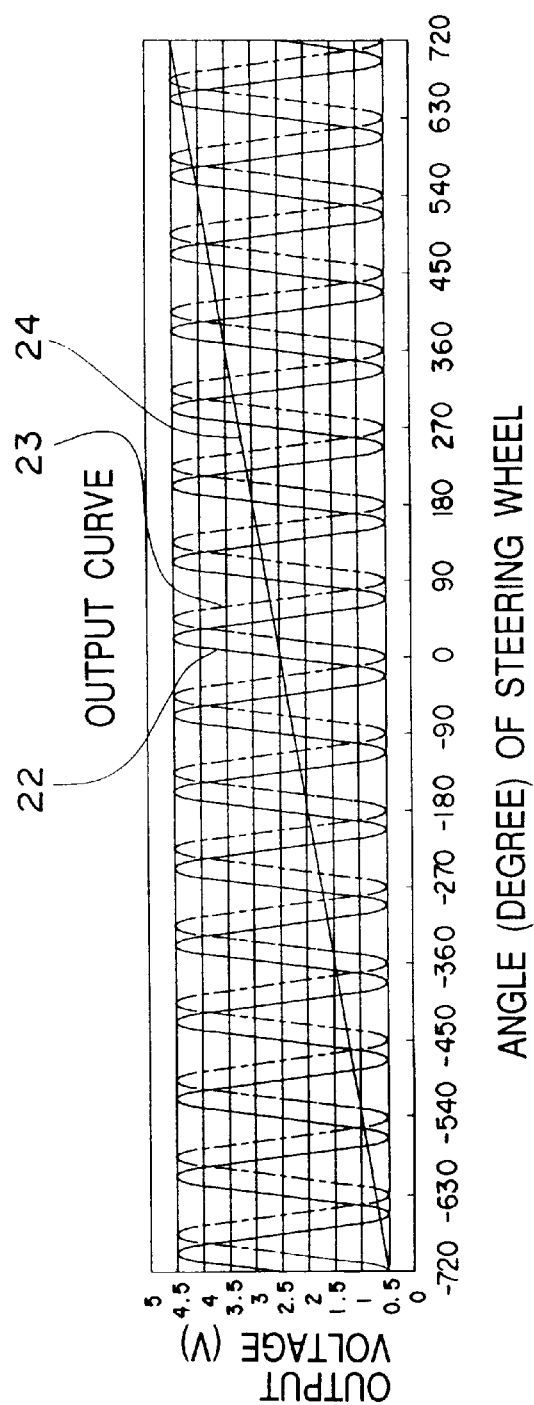
FIG. 31 is an output characteristic diagram of the first, second, third rotation detection means in accordance with the rotation sensor of the present invention.

FIG. 28 shows a schematic circuit structure for processing the first, second, and third detection signals 22, 23, and 24. A micro-computer 25 is served as a turning angle calculation means mounted on an automobile to which the rotation sensor 1 is incorporated, connected to the other end of the cable 18 drawn out from the rotation sensor 1, and connected to control mechanism 26 such as a suspension and an automatic transmission which are to be controlled. The micro-computer 25 receives first, second, third signals 22, 23, and 24, respectively, through the cable 18, which superimposes these signals as shown in FIG. 31, and first detects the rough turning angle and turning direction from the neutral position of the steering wheel based on the third detection signal 24.

Figure 32:
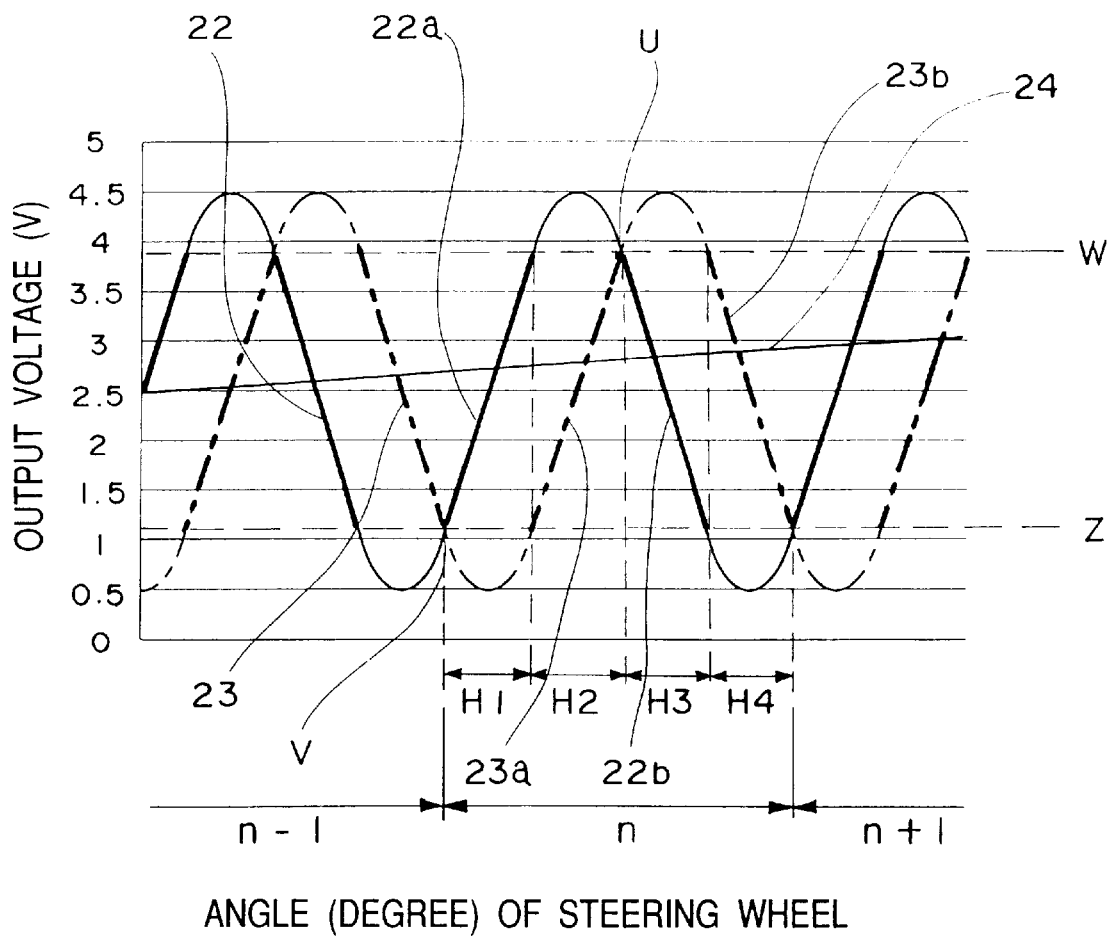
FIG. 32 is an enlarged view of FIG. 31.

Next, the operation for detecting the turning angle value is described with reference to FIG. 32. First, the micro-computer 25 divides the whole turning angle 1440 degrees of the steering wheel into angular sections corresponding to 1 wavelength of the first and second detection signals 22 and 23 (in the present embodiment, 1 angular segment corresponds to 90 degrees), and detects the rough location of the turning angle of the steering wheel based on the third detection signal 24 supplied to the micro-computer 25. In detail, it is detected that the angular segment where the turning angle of the steering wheel is located is the n-th (n is a positive number) angular segment, the (n−1)-th angular segment, or (n+1)-th angular segment.

Next, the micro-computer 25 detects the fine turning angle (accurate turning angle) of the steering wheel in the angular segment (herein, n-th angular segment is assumed to be detected), where the rough turning angle of the steering wheel has been detected, based on the first detection signal 22 and the second detection signal 23. In detail, when both signals are received, first the voltage value W and the voltage Z at intersections U and V are determined. The one signal outside the range between the voltage values Z-W and the other output signal inside the range between the voltage values Z-W are specified. In detail, as obvious from FIG. 32, the first detection signal 22 and the second detection signal 23 namely the one signal and the other signal do not exist outside the range between the voltage values Z-W simultaneously and do not exist inside the range between the voltage values Z-W simultaneously at the arbitrary point excepting the intersections U and V. As a result, the one signal which is outside the range between the voltage values Z-W is specified, that indicates which the other signal is inside the range between the voltage values Z-W as the necessary consequence, and thus the other signal is used as the signal for detecting the fine turning angle of the steering wheel.

Next, the micro-computer 25 checks whether the other signal inside the range between the voltage values Z-W is the first detection signal 22 or the second detection signal 23, and also checks whether the one signal outside the range between the voltage values Z-W is larger than the voltage value W or smaller than the voltage value Z, and the location where the other signal in the range between the voltages Z-W locates is thereby determined from among H1, H2, H3, and H4. As the result of the above-mentioned operation, the inclined lines 22a, 23a, 22b, and 23b are obtained in the range of the angular segment n shown in FIG. 32. The micro-computer 25 detects the fine turning angle of the steering wheel by use of the inclined lines 22a, 23a, 22b, and 23b of the first and second detection signals 22 and 23.

In detail, the third detection signal 24 generated from the third rotation detection means 21 varies linearly even when the steering wheel is rotated a plurality of turns. The turning angle and the turning direction from the neutral position of the steering wheel is therefore detected in real time based on the third detection signal 24. However, the third detection signal 24 varies from 0.5 V to 4.5 V linearly with four turns of the steering wheel, and is therefore disadvantageous in that the resolution, namely the accuracy, is low.

On the other hand, because four periods of the first and second detection signals 22 and 23 generated from the first and second rotation detection means 19 and 20, respectively, correspond to 1 turn of the rotor 3 which is turned together with the steering wheel, the first and second detection signals are advantageous in that the inclination of the inclined lines 22a, 23a, 22b, and 23b with respect to the turning angle of the steering wheel is large and the turning angle and turning direction information of the steering wheel obtained based on the first and second detection signals 22 and 23 is more accurate though the first and second detection signals 22 and 23 are disadvantageous in that the neutral position of the steering wheel can not be specified. Accordingly, the third detection signal 24 is complemented by the inclined lines 22a, 23a, 22b, and 23b by use of the first and second detection signals 22 and 23 alternately by means of the circuit structure as shown in FIG. 28. The turning angle from the neutral position of the steering wheel can be thereby detected accurately and in real time over the wide range.

Even when the third detection signal 24 is complemented over the entire range (in this case, −720 degrees to 720 degrees), because the first and second detection signals 22 and 23 have the same period and the phase of the first detection signal 22 is deviated by ¼ period from the phase of the second detection signal 23, the no signal area X is not found differently from the case of prior art, the variation of the output voltage with respect to the angular change of the steering wheel is always large, and the fine turning angle is detected by means of the inclined linear lines 22a, 23a, 22b, and 23b. Accordingly the turning angle of the steering wheel can be detected accurately and in real time over the entire range. The turning angle and the turning direction of the steering wheel detected as described herein above are sent from the micro-computer 25 to the control mechanism 26 of an automobile. The suspension and automatic transmission of the automobile can thereby be accurately controlled.

As described herein above, in the present embodiment, because the phase difference between the first and second detection signals 22 and 23 is set to be ¼ wavelength, the third detection signal 24 is complemented by use of the first and second detection signals 22 and 23 in the range where these signals are approximately linear. However, the phase difference may be a value near to ¼ wavelength, and in the case that three or more signals are used, the phase difference may be set to be ⅓ and the same process may be performed.

The above-mentioned rotation detection mechanism may comprises a rotation type variable resistor 27 and a slide type variable resistor 37 by use of the above-mentioned rotation shaft 6 to which the rotator 7 and the movable member 10 are attached and which is supported rotatably in the case 2.

Figure 33:
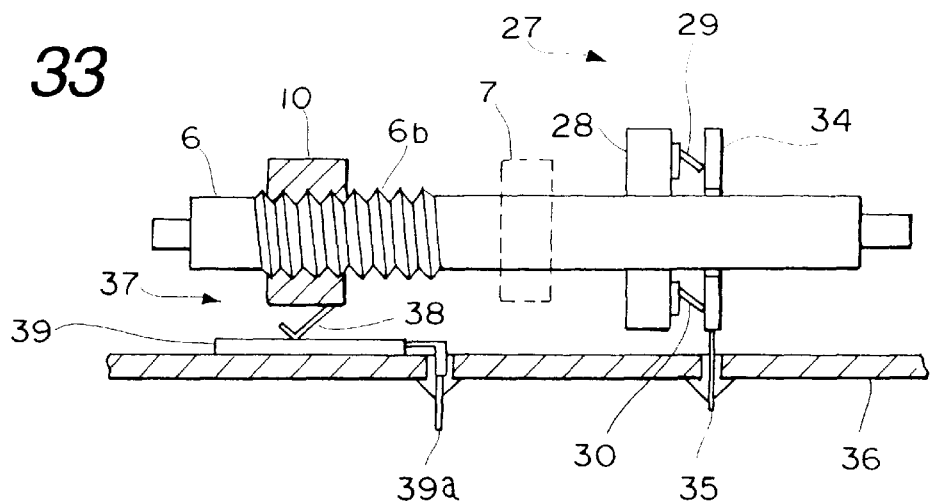
FIG. 33 is a side view of a rotation detection mechanism in accordance with the rotation sensor of the present invention.
Figure 34:
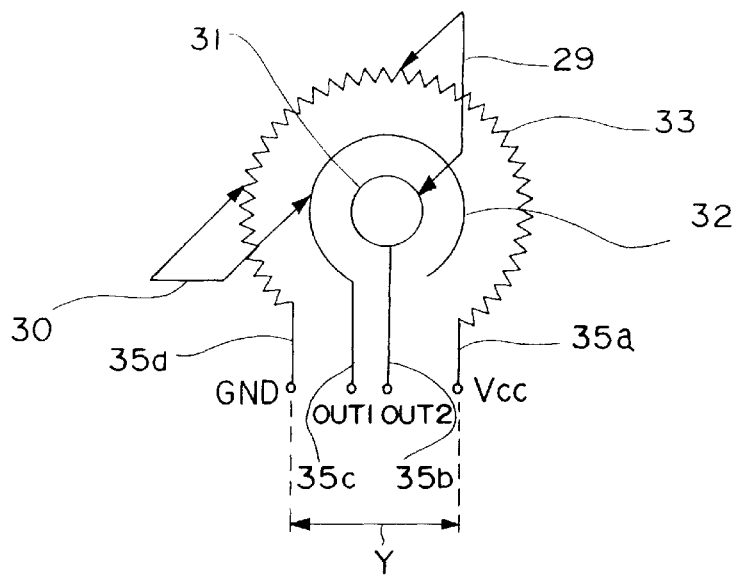
FIG. 34 is a plan view of the first and second detection means in accordance with the rotation sensor of the present invention.

In this case, as shown in FIG. 33 and FIG. 34, the rotation type variable resistor 27 comprises a rotator 28 which rotates together with the rotation shaft 6, the first sliding member 29 comprising a conductive plate supported by the rotator 28, the second sliding member 30 comprising a conductive plate supported by the rotator 28, an insulating board 34 on which the first and second conductive patterns 31 and 32 and a resistor 33 are formed concentrically, and a circuit board 36 to which terminals 35a to 35d extended from the insulating board 34 is connected to fix the insulating board. A voltage Vcc (4 V) is applied to the terminal 35a and the terminal 35d is grounded. Terminals 35b and 35c serve as output terminals of the first and second detection signals 40 and 41, respectively. Herein, the first and second sliding members 29 and 30 are supported with 90 degree angular difference on the insulating board 34, and the first and second conductive patterns 31 and 32 and the resistor 33 are formed on the rotator 28.

The sliding type variable resistor 37 is provided with the third sliding member 38 comprising a conductive plate supported by the movable member 10 and a resistor board 39 connected and supported to the circuit board 36 by means of the terminal 39a on which a resistor (not shown in the drawings) is formed. The first sliding member 29 bridges between the first conductive pattern 31 and the resistor 33, the second sliding member 30 bridges between the second conductive pattern 32 and the resistor 33, and the third sliding member 38 is brought into contact with a resistor not shown in the drawing of the resistor board 39 to fix the circuit board 36 in the case 2. The terminal 39a is served as the output terminal of the third detection signal 42.

In the above-mentioned rotation detection mechanism structured as described herein above, the first sliding member 29 (equivalent to the detector), the first conductive pattern 31, and the resistor 33 (equivalent to the positional information recorder), together constitute the above-mentioned first rotation detection means 19. The second sliding member 30, the second conductive pattern 32, and the resistor 33, together, constitute the above-mentioned second rotation detection means 20. The third sliding member 38 and the resistor (not shown in the drawings) of the resistor board 39, together; constitute the above-mentioned third rotation detection means 21.

Figure 35:
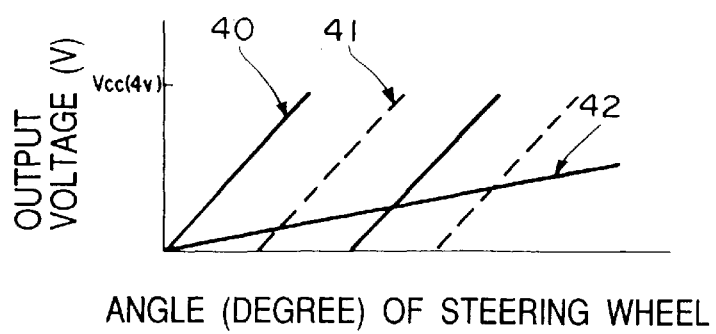
FIG. 35 is an output characteristic diagram of the first, second, and third rotation detection means in accordance with the rotation sensor of the present invention.

As the rotor 3 is turned together with the steering wheel, the first sliding member 29 slides on the first conductive pattern 31 and the resistor 33, the second sliding member 30 slides on the second conductive pattern 32 and the resistor 33, and the third sliding member 38 slides on the resistor (not shown in the drawing) of the resistor board 39. Thereby, as shown in FIG. 35, the first rotation detection means 19 generates a first detection signal 40 having saw tooth alternate waveform which repeats gradual increase between the voltage 0 V and the voltage Vcc, and the second rotation detection means 20 generates a second detection signal 41 having saw tooth alternate waveform, which repeats with a gradual increase, with the same period and the same amplitude (4 V) as those of the first detection signal 40 and with a phase difference of 90 degrees from that of the first detection signal 40. Furthermore, the third rotation detection means 21 generates a third detection signal 42 which gradually increases or gradually decreases between the voltage of 0 V and the voltage of Vcc when the third sliding member 38 is slid on the resistor not shown in the drawing of the resistor board 39.

It is worthy of attention that when the first sliding member 29 is positioned in the section Y where there is no resistor 33 and the first detection signal 40 is not therefore generated, the second detection signal 41 is generated. On the other hand, when the second sliding member 30 is positioned in the section Y where there is no resistor 33 and the second detection signal 41 is not therefore generated, and the first detection signal 40 is generated because the first sliding member 29 is located with 90 degrees deviation from the second sliding member 30 as described herein above, and thus the problem of the no signal area X involved with the prior art described hereinbefore is solved. Accordingly, by processing the first, second, and third detection signals generated respectively from the terminals 35b, 35c, and 39a by means of a rotation angle calculation means such as the micro-computer 25 as described herein above, the turning angle and the turning direction of the steering wheel can be detected accurately and in real time over the entire angular range.

The phase difference between the first detection signal 40 and the second detection signal 41 is 90 degrees in the above-mentioned embodiment. However may be 180 degrees.

Figure 36:
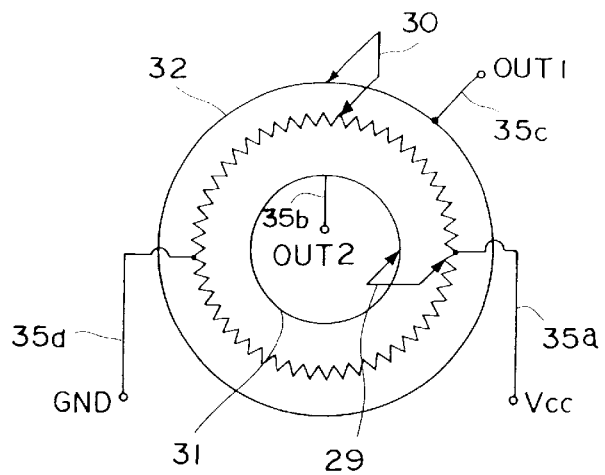
FIG. 36 is a plan view of the first and second detection means in accordance with the rotation sensor of the present invention.
Figure 37:
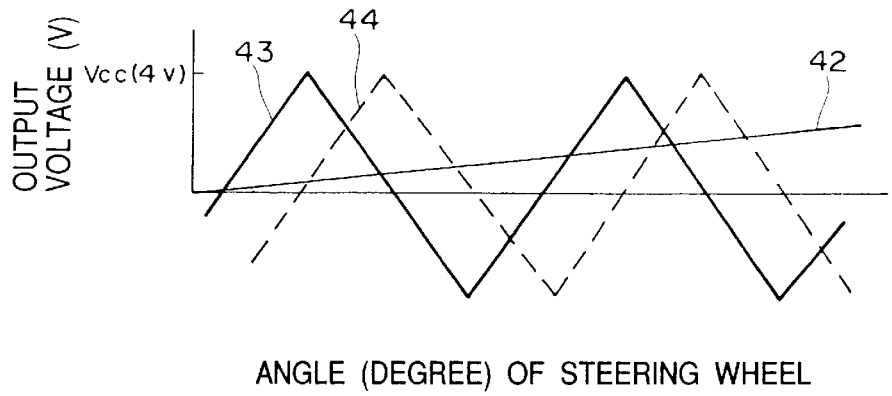
FIG. 37 is an output characteristic diagram of the first, second, and third rotation detection means in accordance with the rotation sensor of the present invention.

Otherwise, a method, in which, by changing the configuration and layout of the first and second conductive patterns 31 and 32 and resistor 33 as shown in FIG. 36, the first rotation detection means 19 generates a first detection signal 43 having triangle alternate waveform which repeats with a gradual increase and a gradual decrease, and the second rotation detection means 20 generates a second detection signal 44 having triangle alternate waveform, which repeats with a gradual increase and a gradual decrease, having the same period as that of the first detection signal 43 and having the phase deviated ¼ period (90 degrees) from that of the first detection signal 43, may be employed. Also in this case, by processing the first, second, and third detection signals 43, 44, and 42, respectively, by use of a turning angle calculation means such as the micro-computer, the turning angle and the turning direction of the steering wheel can be detected accurately and in real time over the entire angular range.

Figure 38:
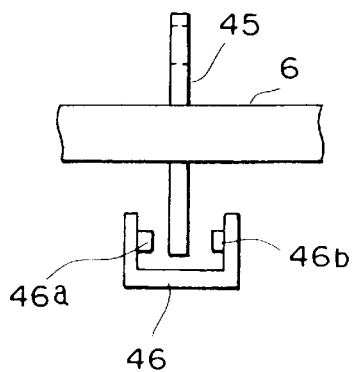
FIG. 38 is a side view of the rotation detection mechanism in accordance with the rotation sensor of the present invention.
Figure 39:
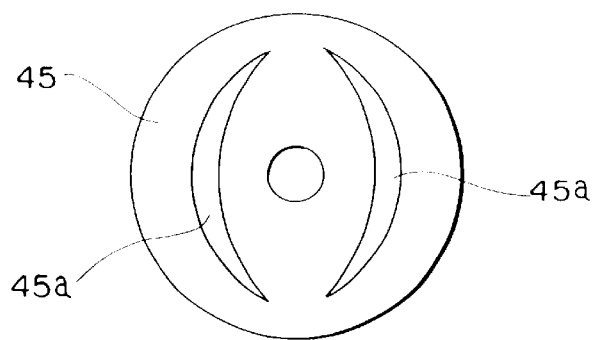
FIG. 39 is a plan view of a slit plate for constituting the rotation detection mechanism in accordance with the rotation sensor of the present invention.
Figure 40:
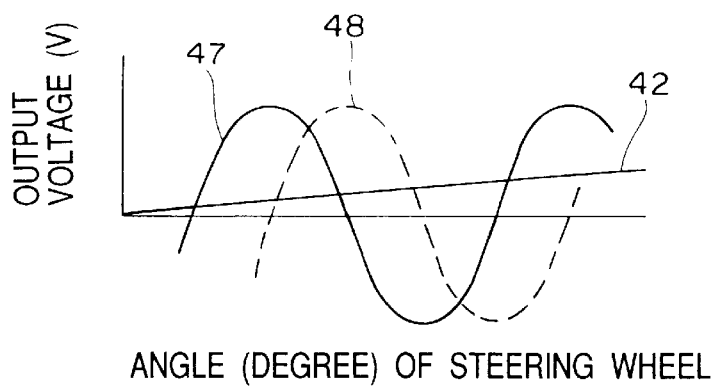
FIG. 40 is an output characteristic diagram of the first, second, and third rotation detection means in accordance with the rotation sensor of the present invention.

The first and second rotation detection means 19 and 20 may be replaced by an optical encoder provided with a code disc 45 (equivalent to the positional information recorder) which turns together with the rotation shaft 6 and on which a pair of crescent-shaped slits 45a and a detection element 46 comprising a light emitting element 46a and a light receiving element 46b (equivalent to the detector) are disposed with interposition of the code disc 45 as shown in FIG. 38 and FIG. 39. In this case, the light emitted from the light emitting element 46a, which light is increased or decreased by means of the slits 45a corresponding to the rotation angle of the rotation shaft 6, is received by the light receiving element 46b, and as the result, the optical encoder generates a first detection signal 47 having sine alternate waveform with a period of 90 degrees which repeats with a gradual increase and a gradual decrease as shown in FIG. 40, and a second detection signal 48 having sine alternate waveform, which repeats gradual increase and gradual decrease, with the same amplitude and the same period as those of the first detection signal 47 and with the phase deviated ¼ period from the first detection signal 47. Also in this case, by processing the first, second, and third detection signals 47, 48, and 42 by use of a turning angle calculation means such as the micro-computer 25 described herein above, the turning angle and the turning direction can be detected accurately and in real time over the entire angular range.

Figure 41:
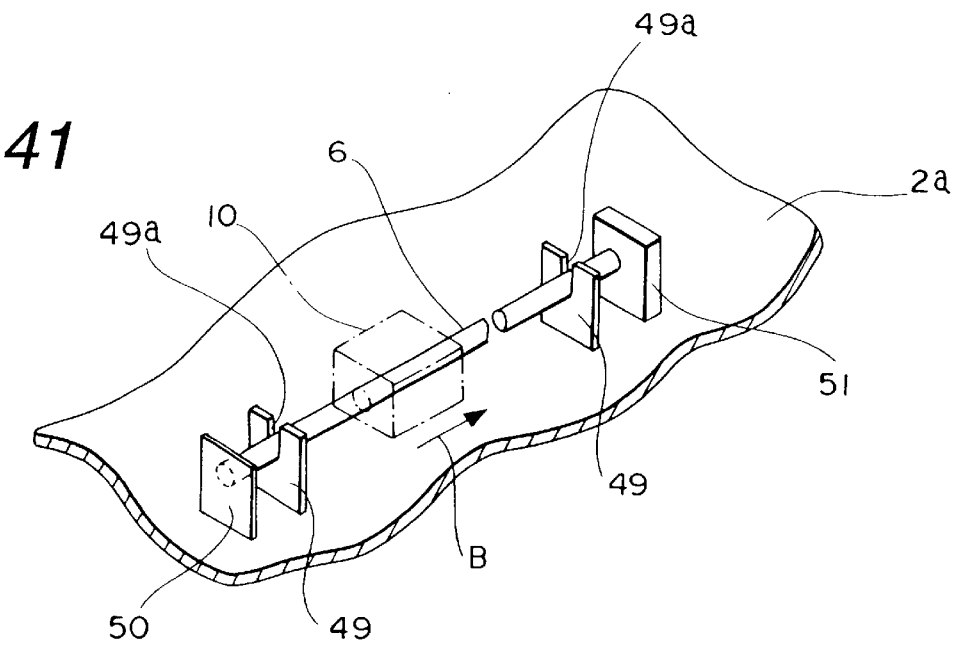
FIG. 41 is a perspective view for illustrating a supporting structure of the rotation shaft in accordance with the rotation sensor of the present invention.
Figure 42:
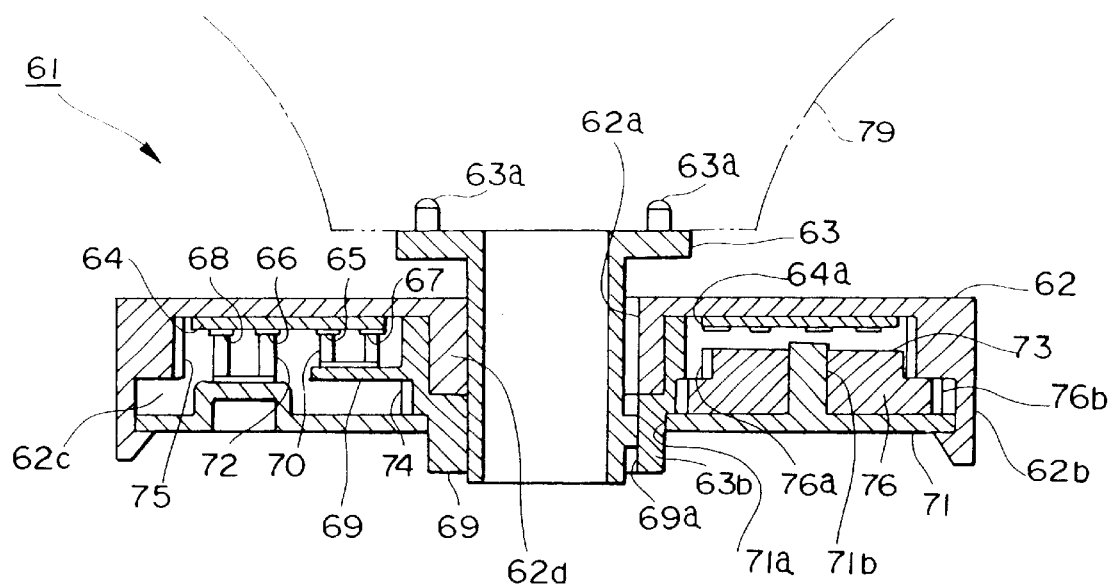
FIG. 42 is a cross sectional view of a conventional rotation sensor.
Figure 43:
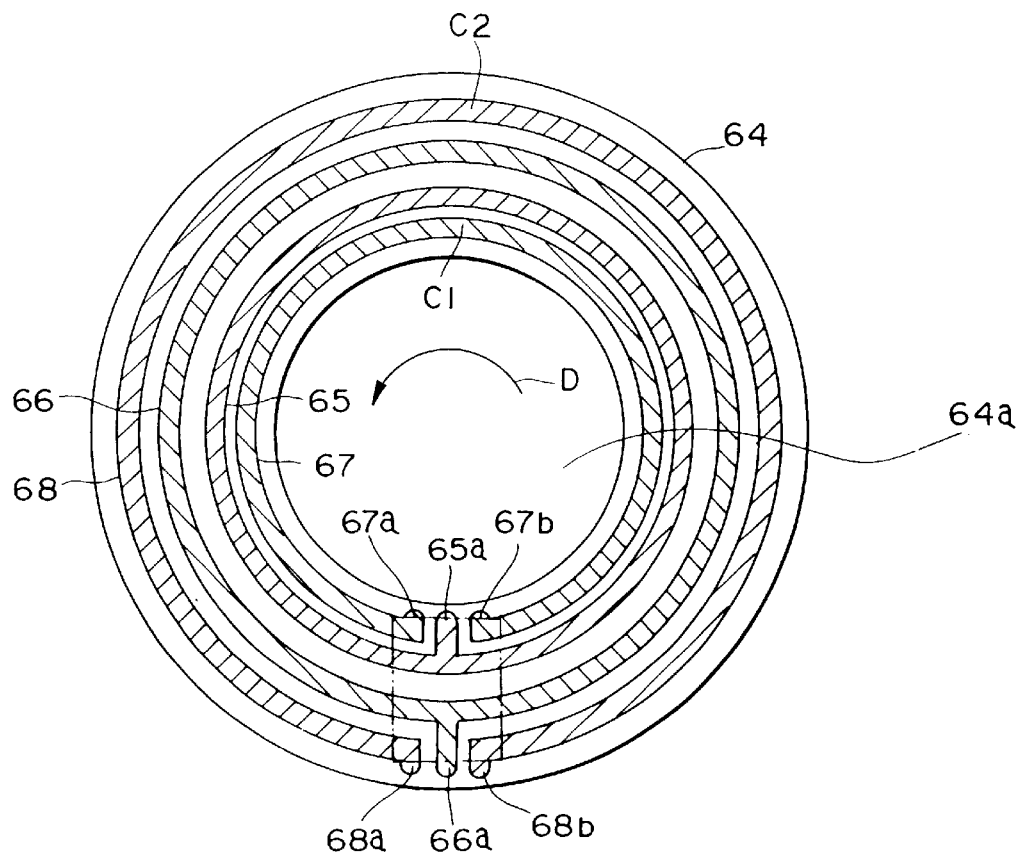
FIG. 43 is a partial plan view of the conventional rotation sensor.
Figure 44:
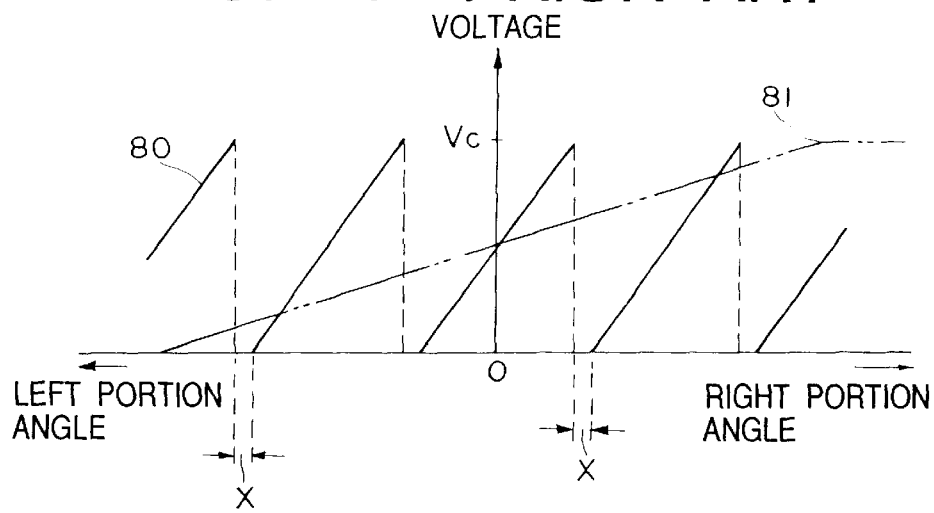
FIG. 44 is an output characteristic diagram of the first and second absolute encoder in accordance with the conventional rotation sensor.
Figure 45:
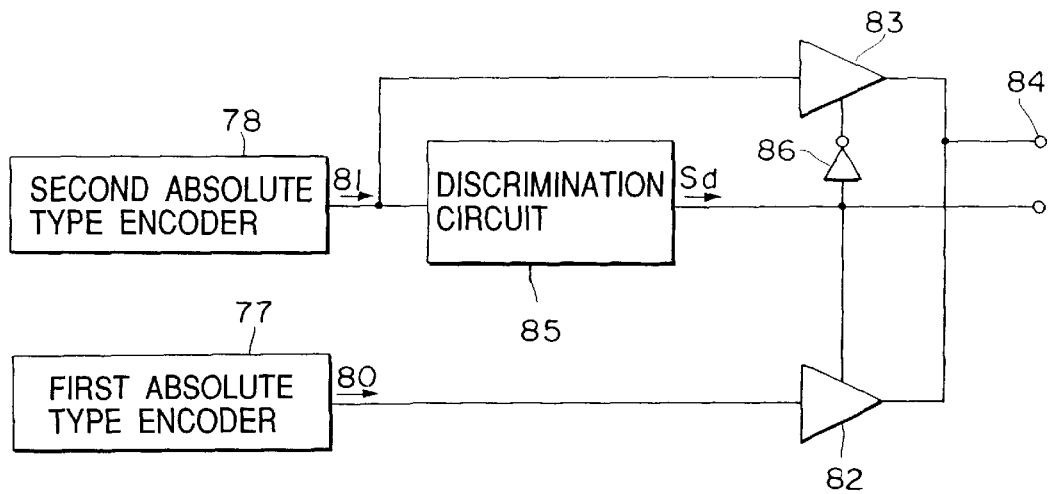
FIG. 45 is a block diagram for illustrating the schematic structure of a signal processing circuit in accordance with the conventional rotation sensor.
Figure 46:
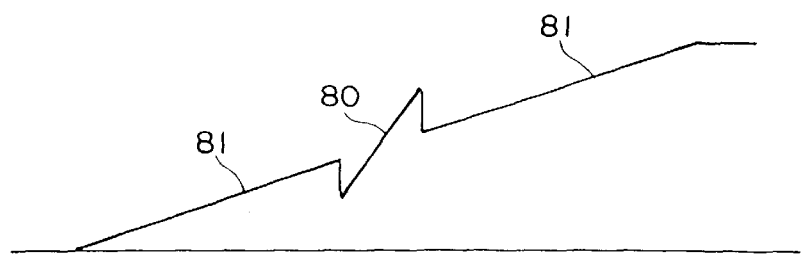
FIG. 46 is an output characteristic diagram of the signal processing circuit in accordance with the conventional rotation sensor.

As shown in FIG. 41, a method, in which both ends of the rotation shaft 6 are held by bottom 2a of the case 2, a pair of holding members 49 each having a slot 49a, each and a pair of walls 50 and 51 which are in contact with the end sides of the rotation shaft 6 perpendicular to the axis direction B are provided, wherein the thickness of the one wall 50 is thinner than that of the other wall 51, the one wall 50 presses the one end side of the rotation shaft 6 in the axis direction B to press the other end side of the rotation shaft 6 against the other wall 51, and the rotation shaft 6 is supported rotatably on the case 2, may be employed. In this case, the rotation shaft 6 is set supportingly on the case 2 only by placing the rotation shaft 6 on the slots 49*a* of the pair of holding members 49, the fabrication efficiency is improved.

What is claimed is:

1. A rotation sensor comprising;
   a rotor;
   first and second rotation detection means for generating first and second detection signals, respectively, having a same period and different phase concomitantly with rotation of said rotor, wherein an output value of at least any one of said first and second detection signals changes gradually concomitantly with a turning of said rotor;
   third detection means for generating a third detection signal concomitantly with rotation of said rotor, wherein an output of said third detection signal increases gradually in the entire range of turning angle of said rotor when said rotor turns in a first direction, further wherein the output of said third detection signal decreases gradually when said rotor turns in a second direction opposite of said first direction; and
   a rotation angle calculation means that reads said third detection signal to obtain a rough turning angle of said rotor based on said third detection signal, reads said first and second detection signals to obtain a fine turning angle of said rotor based on said first and second detection signals, and determines an actual turning angle of said rotor based on the rough turning angle and the fine turning angle.

2. The rotation sensor according to claim 1, wherein, when one of said first or second detection signals is at the top of an output waveform, said rotation angle calculation means reads the output of the other of said first or second detection signals, and calculates the fine turning angle based on the output of the other signal.

3. The rotation sensor according to claim 1, wherein said first and second rotation detection means generate said first and second detection signals, respectively, having a wave type comprising a sine wave, a triangle wave, or a saw tooth wave.

4. The rotation sensor according to claim 1, wherein said fine turning angle is detected on inclined lines of said first and second detection signals.

5. The rotation sensor according to claim 1, wherein the phase difference between said first and second detection signals is 90 degrees.

6. The rotation sensor according to claim 1, wherein each of said first, second, and third rotation detection means comprises a positional information recorder and detector.

7. The rotation sensor according to claim 6, wherein said positional information recorder comprises a magnet and said detector comprises a magneto-electric conversion element.

8. A rotation sensor comprising:
   a rotor;
   a case for containing said rotor and supporting said rotor rotatably;
   a rotation shaft contained in said case and interlocking with the rotation of said rotor;
   a movable member which slides in an axial direction of said rotation shaft and interlocking with the rotation of said rotation shaft;
   first rotation detection means comprising a first positional information recorder and a first detector, wherein one of said first positional information recorder or said first detector is engaged with said rotation shaft and the other is held on said case, first rotation detection means generating a first detection signal concomitantly with rotation operation of said rotational shaft; and
   third detection means comprising a third positional information recorder and a third detector, wherein one of said third positional information recorder or said detector is disposed on said moveable member and the other is held on said case, said third detection means generating a third detection signal having an output which gradually increases over the entire range of the turning angle of said rotor correspondingly to a sliding motion of said movable member in one direction concomitant with turning of said rotor in one direction, and which gradually decreases over the entire range of the turning angle of said rotor correspondingly to said sliding motion of said movable member in the other direction concomitant with turning of said rotor in the other direction.

9. The rotation sensor according to claim 8, wherein said rotation sensor is provided with a second detector, said second detector engaged with the rotation shaft with which said first detector is engaged or said case, and said second detector and said first positional information recorder cooperatively generating a second detection signal having the same period as that of said first detection signal and the phase from said first detection signal.

10. The rotation sensor according to claim 8, wherein;
    a pair of holding members each of which having a slot at the top for allowing said rotation shaft to be inserted downward through said slot is provided in said case, said holding members holding a circumferential surface of both ends of said rotation shaft so as to be rotatable, and
    a pair of walls in contact with both end sides of said rotation shaft provided in said case, the thickness of one of said pair of walls is thinner than that of the other, the one of said pair of walls pressing said rotation shaft in said axial direction to press the other end of said rotation shaft against the other of said pair of walls for contact.

11. The rotation sensor according to claim 8, wherein a guide is provided on said case, a guided member to be engaged with said guide is provided on said movable member, said guided member is guided by said guide so that said movable member is slid in the axial direction of said rotation shaft.

12. The rotation sensor according to claim 8, wherein said third positional information recorder of said third detection means and said third detector of said third detection means comprise a magnet and a magneto-electric conversion element, respectively, wherein said magnet is mounted on said movable member and said magneto-electric conversion element is mounted in said case, and the periphery of the sliding range of said third detection means is covered with a magnetic shielding member.

13. The rotation sensor according to claim 8, wherein a rotator which rotates together with said rotation shaft is attached to said rotation shaft, helical gears are formed both on said rotor and said rotator, said helical gear of said rotor is engaged with said helical gear of said rotation shaft, and said rotation shaft is rotated by linking to the turning of said rotor by means of the engagement.

* * * * *

UNITED STATES PATENT AND TRADEMARK OFFICE
CERTIFICATE OF CORRECTION

PATENT NO.    : 6,246,232 B1
DATED         : June 12, 2001
INVENTOR(S)   : Hirofumi Okumura It is certified that error appears in the above-identified patent and that said Letters Patent is hereby corrected as shown below:

<u>Column 18,</u>
Line 30, after "phase" insert -- different --.

Signed and Sealed this

Twenty-second Day of October, 2002

Attest:

Attesting Officer

JAMES E. ROGAN
Director of the United States Patent and Trademark Office